US 11,754,682 B2

(12) United States Patent
Nothern, III et al.

(10) Patent No.: US 11,754,682 B2
(45) Date of Patent: Sep. 12, 2023

(54) LIDAR SYSTEM WITH SPATIAL BEAM COMBINING

(71) Applicant: Microvision, Inc., Redmond, WA (US)

(72) Inventors: Alga Lloyd Nothern, III, Seattle, WA (US); Jonathan A. Morarity, Seattle, WA (US); Thomas Nonn, Kenmore, WA (US)

(73) Assignee: Microvision, Inc., Redmond, WA (US)

( * ) Notice: Subject to any disclaimer, the term of this patent is extended or adjusted under 35 U.S.C. 154(b) by 1082 days.

(21) Appl. No.: 16/426,920

(22) Filed: May 30, 2019

(65) Prior Publication Data

US 2020/0379090 A1 Dec. 3, 2020

(51) Int. Cl.
| | | |
|---|---|---|
| *G01S 7/481* | (2006.01) | |
| *G01S 7/4865* | (2020.01) | |
| *G01S 17/89* | (2020.01) | |
| *G01S 17/931* | (2020.01) | |
| *G01S 17/10* | (2020.01) | |
| *G01S 7/48* | (2006.01) | |
| *G01S 13/42* | (2006.01) | |

(52) U.S. Cl.
CPC .......... *G01S 7/4817* (2013.01); *G01S 7/4802* (2013.01); *G01S 7/4815* (2013.01); *G01S 7/4865* (2013.01); *G01S 13/426* (2013.01); *G01S 17/10* (2013.01); *G01S 17/89* (2013.01); *G01S 17/931* (2020.01)

(58) Field of Classification Search
CPC .... G01S 7/4817; G01S 17/931; G01S 7/4802; G01S 7/4815; G01S 7/4865; G01S 13/426; G01S 17/10; G01S 17/89
See application file for complete search history.

(56) References Cited

U.S. PATENT DOCUMENTS

| | | |
|---|---|---|
| 7,609,875 B2 | 10/2009 | Liu et al. |
| 8,446,571 B2 | 5/2013 | Fiess et al. |
| 9,098,931 B2 | 8/2015 | Shpunt et al. |
| 9,267,787 B2 | 2/2016 | Shpunt |
| 9,651,417 B2 | 5/2017 | Shpunt et al. |
| 9,677,878 B2 | 6/2017 | Shpunt et al. |
| 9,753,351 B2 | 9/2017 | Eldada |
| 9,804,264 B2 | 10/2017 | Villenueve et al. |
| 9,823,353 B2 | 11/2017 | Eichenholz et al. |
| 9,841,495 B2 | 12/2017 | Campbell et al. |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,898,074 B2 | 2/2018 | Shpunt et al. |
| 9,958,545 B2 | 5/2018 | Eichenholz et al. |
| 2004/0117090 A1 | 6/2004 | Samukawa |

(Continued)

*Primary Examiner* — Isam A Alsomiri
*Assistant Examiner* — Joseph C Fritchman
(74) *Attorney, Agent, or Firm* — Kevin D. Wills

(57) ABSTRACT

A light detection and ranging system includes synchronously scanning transmit and receive mirrors that scan a pulsed fanned laser beam in two dimensions. Imaging optics image a receive aperture onto an arrayed receiver that includes a plurality of light sensitive devices. Scanning mirror offsets may be applied to modify a fan angle of the pulsed fanned laser beam. Adaptive methods dynamically modify the size and location of the field of view, laser pulse properties, and/or fan angle in response to internal and external sensors data.

20 Claims, 17 Drawing Sheets

*FIG. 9*

(56) References Cited

U.S. PATENT DOCUMENTS

| | | | |
|---|---|---|---|
| 2006/0176482 A1* | 8/2006 | Hamar | G01S 3/784 |
| | | | 356/400 |
| 2013/0222865 A1* | 8/2013 | Iwamatsu | G02B 6/0043 |
| | | | 358/484 |
| 2016/0195386 A1 | 7/2016 | Yoon et al. | |
| 2017/0090032 A1 | 3/2017 | Ridderbusch | |
| 2017/0090034 A1 | 3/2017 | Ridderbusch | |
| 2017/0131388 A1 | 5/2017 | Campbell et al. | |
| 2017/0153319 A1 | 6/2017 | Villeneuve et al. | |
| 2017/0176596 A1 | 6/2017 | Shpunt et al. | |
| 2017/0205873 A1 | 7/2017 | Shpunt et al. | |
| 2017/0214839 A1 | 7/2017 | Keller | |
| 2017/0244955 A1 | 8/2017 | Shpunt et al. | |
| 2017/0310948 A1* | 10/2017 | Pei | G01S 7/4972 |
| 2018/0088236 A1 | 3/2018 | Eichenholz et al. | |
| 2018/0120433 A1 | 5/2018 | Eichenholz et al. | |
| 2018/0275249 A1* | 9/2018 | Campbell | G01S 7/4815 |
| 2018/0284244 A1 | 10/2018 | Russell | |
| 2018/0284286 A1* | 10/2018 | Eichenholz | G01S 17/89 |
| 2018/0329037 A1* | 11/2018 | Bozchalooi | G01S 7/4815 |
| 2019/0101626 A1* | 4/2019 | Gilliland | G01S 7/4817 |
| 2019/0212419 A1 | 7/2019 | Jeong | |
| 2020/0025923 A1 | 1/2020 | Eichenholz | |
| 2020/0150209 A1* | 5/2020 | Kirillov | G01S 17/10 |
| 2020/0343686 A1* | 10/2020 | Jander | H01S 5/023 |
| 2020/0363511 A1* | 11/2020 | Takeda | G02B 26/10 |
| 2021/0025997 A1* | 1/2021 | Rosenzweig | G01S 7/4868 |
| 2021/0120430 A1 | 4/2021 | Kawanishi | |

\* cited by examiner

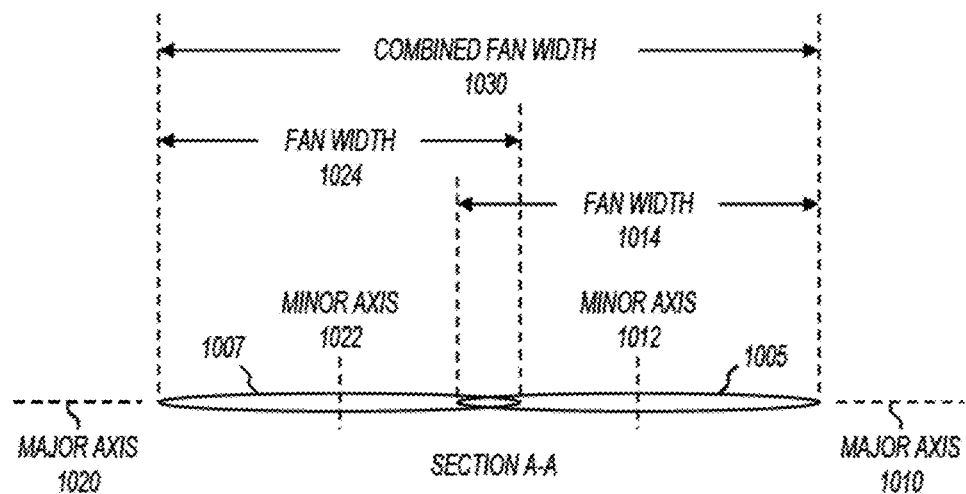
SECTION A-A
*FIG. 12*
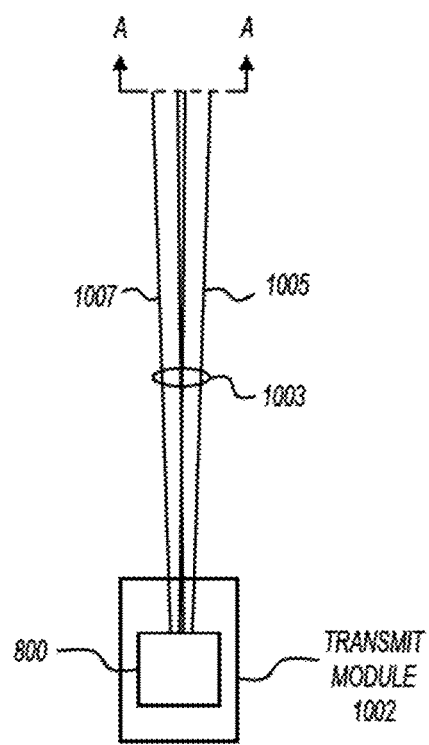

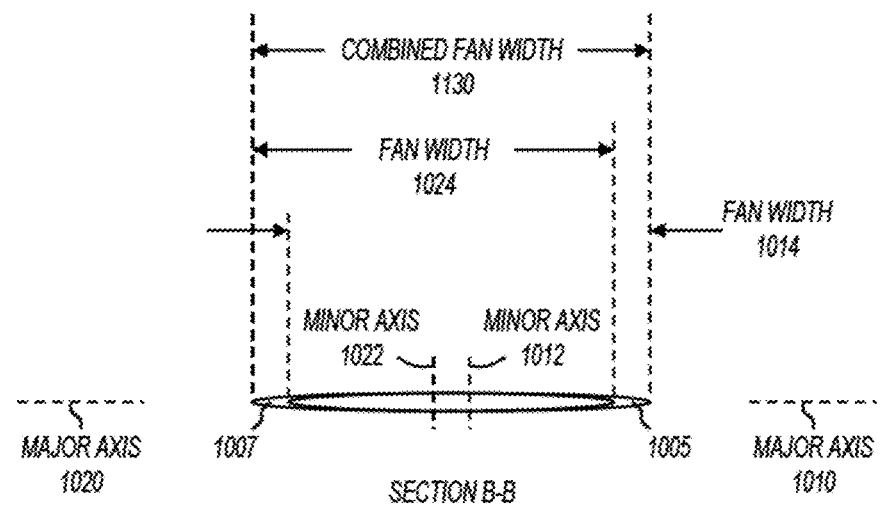
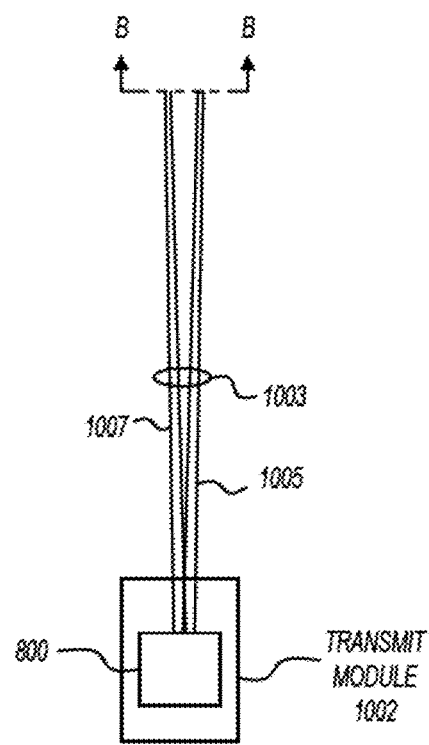
FIG. 13

| Vehicle Speed (kph) | 0-30 | 30-70 | 70+ |
|---|---|---|---|
| Scene Rate (Hz) | 120 | 120 | 120 |
| HFOV (deg) | 120 | 60 | 30 |
| VFOV (deg) | 30 | 20 | 15 |
| Optimized Range (m) | 30 | 90 | 240 |
| H Resolution @ Scene Rate (deg) | 0.10 | 0.10 | 0.10 |
| V Resolution @ Scene Rate (deg) | 0.03 | 0.06 | 0.12 |
| H Resolution @ 30Hz (deg) | 0.05 | 0.05 | 0.05 |
| V Resolution @ 30Hz (deg) | 0.03 | 0.03 | 0.03 |
| Fan Angle (deg) | 8 | 4 | 2 |
| Pulse Rate | Nom | ▼ | ▼▼ |
| Pulse Power | Nom | ▲ | ▲▲ |
| Pulse Energy | Nom | ▲ | ▲▲ |

*FIG. 26*    2400

LIDAR SYSTEM WITH SPATIAL BEAM COMBINING

FIELD

The present invention relates generally to light detection and ranging (LIDAR) systems, and more specifically to scanning LIDAR systems.

BACKGROUND

In some laser light applications, it may be desirable to increase the emitted laser light power. For example, in LIDAR systems, increasing emitted light power increases range and/or the return photon budget for a given range. Emitted light power can be increased by combining laser light beams from multiple sources. Combining laser light of different wavelengths from different sources can be readily achieved using dichroic surfaces, thereby increasing the total emitted light power. This technique works well as long as the light beams from the different sources are sufficiently spaced in wavelength.

Combining laser light of the same wavelength from different sources presents additional challenges. Because wavelength separation is required to combine light beams using dichroic surfaces, these surfaces cannot be used to combine light beams of the same wavelength. Polarization beam combining is a technique that can combine same-wavelength light beams having different linear polarization states (S,P) using a polarizing beam splitter; however, the number of beams that can be combined using this technique is limited to two.

BRIEF DESCRIPTION OF THE DRAWINGS

FIGS. 12 and 13 show beam combining and fan angle control in accordance with various embodiments of the present invention;

FIG. 26 shows alternate scanning patterns in the field of view in accordance with various embodiments of the present invention.

DESCRIPTION OF EMBODIMENTS

Figure 1:
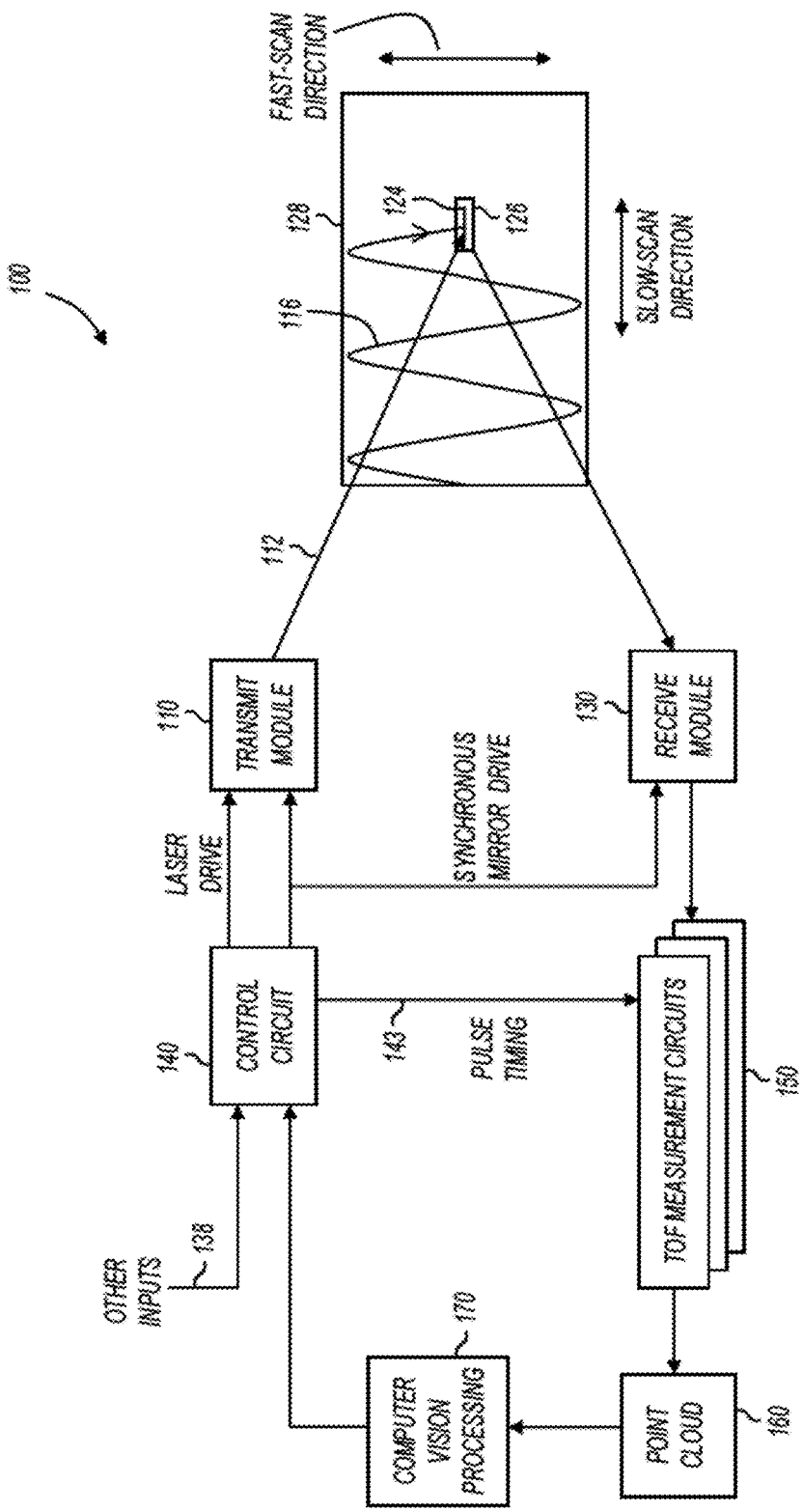
FIG. 1 shows a steered LIDAR system with an arrayed receiver in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a steered LIDAR system with an arrayed receiver in accordance with various embodiments of the present invention. System 100 includes control circuit 140, transmit module 110, receive module 130, time-of-flight (TOF) measurement circuits 150, point cloud storage device 160, and computer vision processing 170.

Transmit module 110 emits a scanning pulsed fanned laser beam 112 that traverses a field of view 128 in two dimensions. The shape of the fanned beam is shown at 124, and the scanning trajectory that the pulsed fanned beam takes through the field of view is shown at 116. To produce the scanning pulsed fanned beam, transmit module 110 includes a laser light source to produce a pulsed laser beam, collimating and focusing optics to shape the pulsed laser beam into a pulsed fanned laser beam, and one or more scanning mirrors to scan the pulsed fanned laser beam in two dimensions in the field of view. Example embodiments of transmit modules are described more fully below with reference to later figures.

Receive module 130 includes an arrayed receiver that includes a plurality of light sensitive devices. Receive module 130 also includes optical devices and one or more scanning mirrors to scan in two dimensions and to direct reflected light from the field of view to the arrayed receiver. As shown in FIG. 1, receive module 130 captures reflected light from an aperture 126 that encompasses the location of the fanned beam in the field of view. Example embodiments of receive modules are described more fully below with reference to later figures.

The reflected fanned beam becomes "discretized" by the array of light sensitive devices, and the corresponding points in the field of view from which the beam is reflected are referred to herein as "measurement points."

As used herein, the term "fanned beam" refers to a beam of light that has been purposely shaped to encompass more measurement points in one dimension than in another dimension. For example, as shown in FIG. 1, fanned beam 112 includes shape 124 that encompasses more measurement points in the horizontal dimension than in the vertical dimension.

Time-of-flight (TOF) measurement circuits 150 are each coupled to one of the light sensitive devices in the arrayed receiver to measure a time-of-flight of a laser pulse. TOF measurement circuits 150 receive laser light pulse timing information 143 from control circuit 140 and compare it to the timing of received laser light pulses to measure round trip times-of-flight of light pulses, thereby measuring the distance (Z) to the point in the field of view from which the laser light pulse was reflected. Accordingly, TOF measurement circuits 150 measure the distance between LIDAR system 100 and measurement points in the field of view at which light pulses from the scanned fanned beam are reflected.

TOF measurement circuits 150 may be implemented with any suitable circuit elements. For example, in some embodiments, TOF measurement circuits 150 include digital and/or analog timers, integrators, correlators, comparators, registers, adders, or the like to compare the timing of the reflected laser light pulses with the pulse timing information received from control circuit 140.

Point cloud storage 160 receives TOF information corresponding to distance (Z) information from TOF measurement circuits 150. In some embodiments, the TOF measurements are held in point cloud storage 160 in an array format such that the location within point cloud storage 160 indicates the location within the field of view from which the measurement was taken. In other embodiments, the TOF measurements held in point cloud storage 160 include (X,Y) position information as well as TOF measurement information to yield (X,Y,Z) as a three dimensional (3D) data set that represents a depth map of the measured portion of the field of view 128. The point cloud data may then be used for any suitable purpose. Examples include 3D imaging, velocity field estimation, object recognition, adaptive field of view modifications, laser light property modifications, and the like.

Point cloud storage 160 may be implemented using any suitable circuit structure. For example, in some embodiments, point cloud storage 160 is implemented in a dual port memory device that can be written on one port and read on a second port. In other embodiments, point cloud storage 160 is implemented as data structures in a general purpose memory device. In still further embodiments, point cloud storage 160 is implemented in an application specific integrated circuit (ASIC).

Computer vision processing 170 perform analysis on the point cloud data and provide feedback to control circuit 140. For example, in some embodiments, computer vision processing 170 perform object identification, classification, and tracking within the field of view, and provide this information to control circuit 140. Computer vision processing 170 may take any form, including neural networks of any depth, convolutional neural nets, traditional vision processing methods, and the like. In some embodiments, computer vision processing 170 is omitted.

Control circuit 140 determines laser drive properties and drives transmit module 110 with signal(s) that cause the light source to emit laser light pulses having the specified properties. For example, control circuit 140 may determine values for laser drive power, pulse rate, pulse width, and number of multishot pulses. Further, as described more fully below, control circuit 140 may adaptively modify the laser drive properties in response to feedback from computer vision processing 170 or in response to other inputs 138.

Control circuit 140 also controls the movement of scanning mirrors within transmit module 110 and receive module 130. For example, control circuit 140 may drive microelectromechanical (MEMS) mirrors within transmit module 110 and receive module 130 with signals that cause the mirrors to move non-resonantly through angular extents of mirror deflection with angular offsets that define the size and location of field of view 128. In some embodiments, the angular offsets also define the size and/or shape of the fanned beam. Control circuit 140 synchronizes the movement between mirrors in transmit module 110 and receive module 130 so that aperture 126 is continually positioned in the field of view to receive light reflected from objects that are illuminated with pulsed fanned beam 112. The synchronization of transmit and receive scanning allows the receive aperture 126 to only accept photons from the portion of the field of view where the transmitted energy was transmitted. This results in significant ambient light noise immunity.

Control circuit 140 is implemented using functional circuits such as phase lock loops (PLLs), filters, adders, multipliers, registers, processors, memory, and the like. Accordingly, control circuit 140 may be implemented in hardware, software, or in any combination. For example, in some embodiments, control circuit 140 is implemented in an application specific integrated circuit (ASIC). Further, in some embodiments, some of the faster data path control is performed in an ASIC and overall control is software programmable.

As shown in FIG. 1, the two dimensional scanning is performed in a first dimension (vertical, fast-scan direction) and a second dimension (horizontal, slow-scan direction). The labels "vertical" and "horizontal" are somewhat arbitrary, since a 90 degree rotation of the apparatus will switch the horizontal and vertical directions. Accordingly, the terms "vertical" and "horizontal" are not meant to be limiting.

The scanning trajectory in the fast-scan direction is shown as sinusoidal, and the scanning trajectory in the slow-scan direction is shown as constant velocity, although this is not a limitation of the present invention. In some embodiments, all mirror motion is operated quasi-statically far from resonance. Accordingly, a relatively flat control band exists down to and including 0 Hz. This allows a drive signal to be generated to cause the pointing angle (boresight) of the LIDAR system to deflect to a desired position in two dimensions (azimuth & elevation) of a spherical coordinate space, offset from the mirror relaxation point.

The angular extents of mirror deflection of both the transmit and receive modules can be adjusted to change the active field of view of the LIDAR system. The MEMS mirrors are designed for reliable operation at some maximum angle of deflection in each scan direction. From that nominal/max operating point, the drive amplitude may be reduced to collapse the deflection angle and narrow the active field of view. All else being equal, this results in a proportional increase in the angular resolution of the acquired scene.

In some embodiments, it is beneficial to trade off surplus angular resolution for increased range of measurement. For example, reducing the pulse repetition rate allows for a longer flight time in between adjacent pulses, eliminating range aliasing out to a proportionally larger distance. Accordingly, a balance exists such that reducing the field of view increases the non-ambiguous range of the LIDAR system without changing the angular resolution of the acquired scene. In some embodiments, laser power modifications are performed as a complement to increased range. For example, the laser power may be scaled as the square of the proportional increase in range. In still further embodiments, the size and/or shape of the fanned beam is modified as a complement to increased range.

Though the scanned field of view, fanned beam shape and/or size, pulse repetition rate, and laser power may all be independently controlled by software configuration, in some embodiments, it may be desirable to also design them to be commanded in a coordinated manner, automatically under hardware control. Examples are provided below.

Pulse width may also be controlled in the same manner in order to augment the scaled distance of interest. As the pulse width is increased, additional energy is deposited into the scene, increasing the likelihood of a sufficient number of photons returning to the receiver to trip the detection threshold. In some embodiments, increasing the pulse width is only performed when the peak power is maxed out as a wider pulse increases time resolution error for weak returns. This tradeoff is often warranted and useful as absolute time/distance resolution is typically not as important as percentage error which self-normalizes with distance.

Pulse energy may also be augmented by means of a train of shorter multishot pulses. The number of pulses may be varied to achieve the desired amount of energy in addition to or in place of modification of the pulse width.

Figure 2:
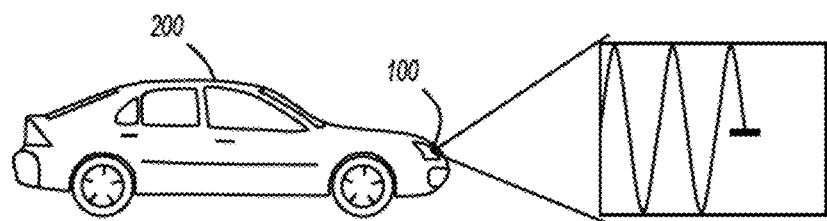
FIG. 2 shows an automotive application of a steered LIDAR system with an arrayed receiver in accordance with various embodiments of the present invention.

FIG. 2 shows an automotive application of a steered LIDAR system with an arrayed receiver in accordance with various embodiments of the present invention. As shown in FIG. 2, vehicle 200 includes LIDAR system 100 at the front of the vehicle. LIDAR system 100 synchronously scans transmit and receive scanning mirrors such that receive aperture 126 substantially overlaps the shape 124 of the pulsed fanned beam. Although much of the remainder of this description describes LIDAR systems in the context of an automotive application, the various embodiments of the present invention are not limited in this respect.

Figure 3:
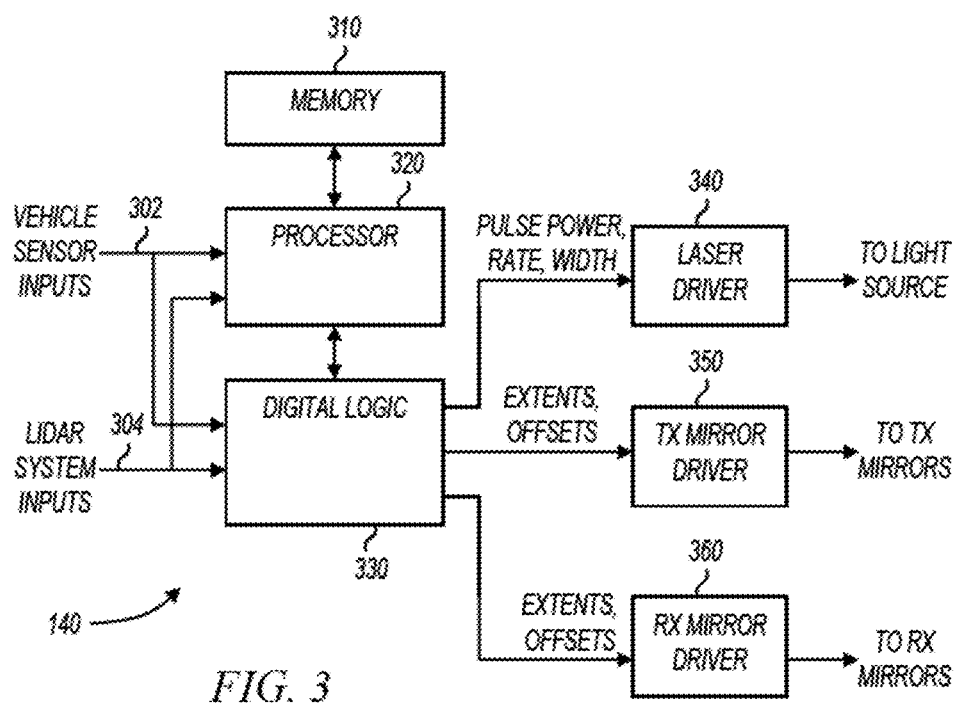
FIG. 3 shows a block diagram of a control circuit in accordance with various embodiments of the present invention.

FIG. 3 shows a block diagram of a control circuit in accordance with various embodiments of the present invention. The example embodiment shown in FIG. 3 corresponds to a control circuit that may be included when LIDAR system 100 is used in an automotive application. Other control circuit embodiments may be employed when used in applications other than automotive applications. Control circuit 140 includes processor 320, memory 310, digital logic 330, laser driver 340, transmit mirror driver 350, and receive mirror driver 360. Control circuit 140 receives vehicle sensor inputs at 302 and LIDAR system inputs at 304. Vehicle sensor inputs may include any type of data produced by sensors on a vehicle. Examples include data describing vehicle position, speed, acceleration, and direction. Other examples include sensor data received from adaptive driver assistance systems (ADAS) or other vehicle mounted sensors. LIDAR system inputs may include any data gathered or produced by the LIDAR system. Examples include computer vision processing results, internal inertial measurement unit data, and the like.

Processor 320 may include any type of processor capable of executing instructions stored in a memory device. For example, processor 320 may be a microprocessor, a digital signal processor, or a microcontroller. Processor 320 may also be a hard-coded processor such as a finite state machine that provides sequential flow control without fetching and executing instructions.

Memory 310 may be any device that stores data and/or processor instructions. For example, memory 310 may be a random access memory device that stores data. In some embodiments, memory 310 is a nontransitory storage device that stores instructions, that when accessed by processor 320 result in processor 320 performing actions. For example, in some embodiments, processor 320 executes instructions stored in memory 310 and performs method embodiments of the present invention.

Digital logic 330 receives vehicle sensor inputs at 302 and LIDAR system inputs at 304 and outputs information used to control a laser light source and scanning mirrors. Digital logic 330 may produce the outputs based solely on the vehicle sensor data and/or LIDAR system data, may produce the outputs based solely on interactions with processor 320, or may produce the outputs based on a combination of the vehicle sensor data, LIDAR system data, and interaction with processor 320. For example, in some embodiments, digital logic 330 modifies laser light pulse parameters such as pulse power, repetition rate, pulse width, and number of multishot pulses in response to vehicle sensor data and/or LIDAR system data. Also for example, in some embodiments, digital logic 330 modifies angular extents and angular offsets used to drive the scanning mirrors in the transmit module and receive module in response to vehicle sensor data and/or LIDAR system data.

In some embodiments, digital logic 330 provides output data under software control via interaction with processor 320. For example processor 320 may determine values for any of the outputs in response to vehicle sensor data and/or LIDAR system data, and then command digital logic under software control. In other embodiments, digital logic 330 may provide output data under hardware control independent of processor 320. For example, an adaptive model may be programmed into digital logic 330 in advance, and digital logic 330 may then modify outputs as a function of vehicle sensor data and/or LIDAR system data at a much faster rate.

Examples of adaptive modes (under software control and hardware accelerated) are described more fully below with reference to later figures.

Laser driver 340 receives laser light properties from digital logic 330 and drives the laser light source. For example, laser driver 340 may receive property values for pulse power, pulse repetition rate, pulse width, and number of multishot pulses, and produce an analog signal to drive a laser light source. Laser driver 340 may be implemented with any suitable circuit elements including for example, high speed signal generators, amplifiers, filters, and the like.

Mirror drivers 350, 360 receive angular extent and angular offset information from digital logic 330 and produce signals to cause scanning mirrors in modules 110, 130 to undergo motion. Transmit mirror driver 350 and receive mirror driver 360 may be implemented using any suitable circuit structures including for example, phase lock loops, numerically controlled oscillators, filters, amplifiers, and the like.

Figure 4:
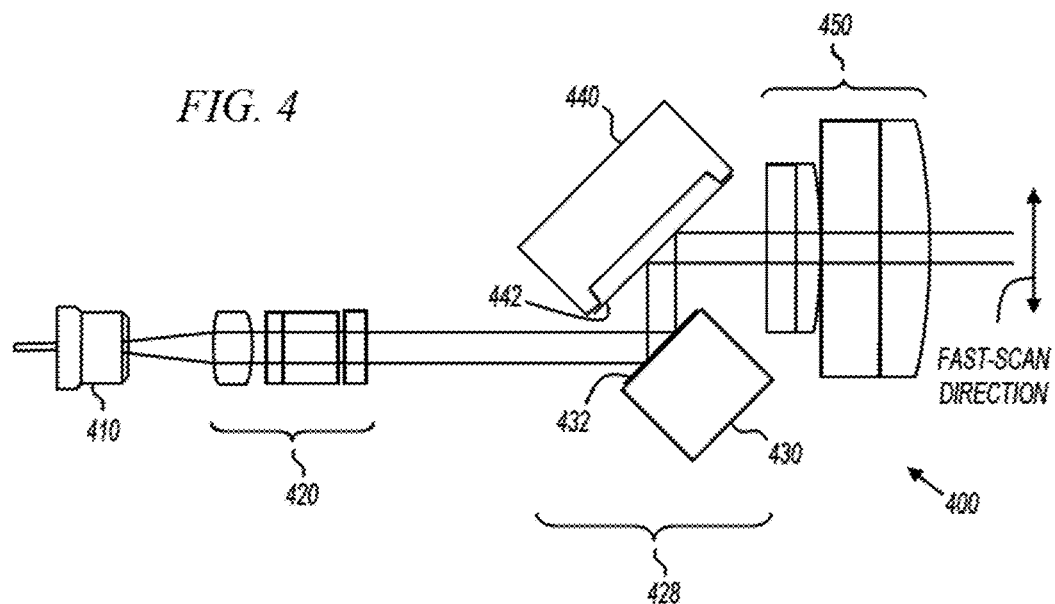
FIG. 4 shows a side view of a transmit module in accordance with various embodiments of the present invention.
Figure 5:
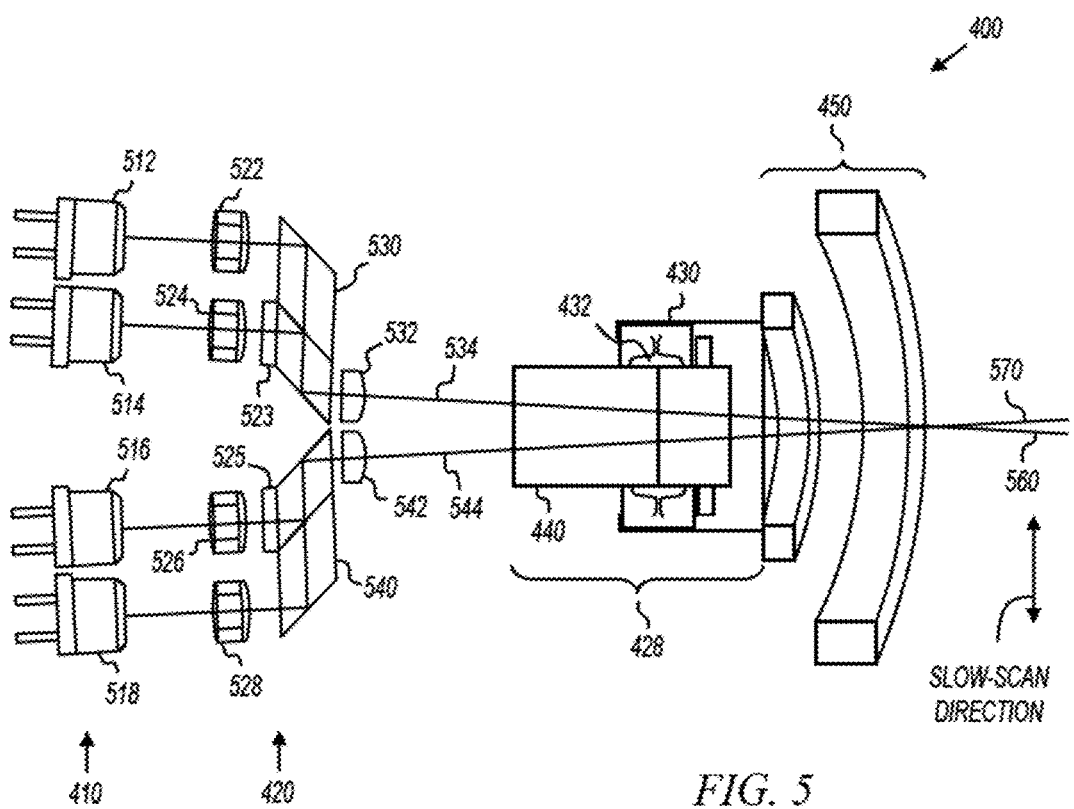
FIG. 5 shows a top view of a transmit module in accordance with various embodiments of the present invention.

FIG. 4 shows a side view and FIG. 5 shows a top view of a transmit module in accordance with various embodiments of the present invention. Transmit module 400 is an example embodiment of transmit module 110 (FIG. 1). Transmit module 400 includes laser light source 410, beam shaping optical devices 420, scanning mirror assembly 428, and exit optical devices 450.

In some embodiments, laser light source 410 sources nonvisible light such as infrared (IR) light. In these embodiments, the receive module 130 (FIG. 1) is able to detect the same wavelength of nonvisible light. For example, in some embodiments, light source 410 may include a laser diode that produces infrared light with a wavelength of substantially 940 nanometers (nm), and receive module 130 detects reflected light pulses with a wavelength of substantially 940 nm. Also for example, in some embodiments, light source 410 may include a laser diode that produces infrared light with a wavelength of substantially 900 nanometers (nm), and receive module 130 detects reflected light pulses with a wavelength of substantially 900 nm. The wavelength of light is not a limitation of the present invention. Any wavelength, visible or nonvisible, may be used without departing from the scope of the present invention.

Laser light source 410 may include any number or type of emitter suitable to produce a pulsed fanned laser beam. For example, in some embodiments, laser light source 410 includes multiple laser diodes shown in FIG. 5 at 512, 514, 516, and 518. Light beams emitted from laser diodes 512 and 514 are combined using polarization beam combining to form light beam 534, and light beams emitted from laser diodes 516 and 518 are combined using polarization beam combining to form light beam 544. For example, optical devices 522 and 524 collimate and focus the light from diodes 512, 514, and polarizing beam splitter 530 combines the beams after one of the beams passes through polarization rotator 523. The resulting beam is focused or expanded in the slow-scan direction by optical device 532 to create a fanned beam at 534. Also for example, optical devices 526 and 528 collimate and focus the light from diodes 516 and 518, and polarizing beam splitter 540 combines the beams after one of the beams passes through polarization rotator 525. The resulting beam is focused or expanded in the slow-scan direction by optical device 542 to create a fanned beam at 544.

In some embodiments, each of beams 534 and 544 may be collimated in the fast-scan direction with <0.2 degrees of divergence, and may be focused or expanded in the slow-scan direction to diverge at a rate that produces a fan angle of substantially four degrees. Beam sizes and divergence values are not necessarily uniform across the various embodiments of the present invention; some embodiments have higher values, and some embodiments have lower values.

Scanning mirror assembly 428 receives the pulsed fanned laser beams from optical devices 420 and scans the pulsed fanned beams in two dimensions. In embodiments represented by FIGS. 4 and 5, scanning mirror assembly 428 includes two separate scanning devices 430, 440, each including a scanning mirror 432, 442, where each scanning mirror scans the beams in one dimension. For example, scanning mirror 432 scans the pulsed fanned beams in the fast-scan (vertical) direction, and scanning mirror 442 scans the pulsed fanned beams in the slow-scan (horizontal) direction.

Scanning devices 430, 440 are driven by signals received from control circuit 140 (FIGS. 1, 3). For example, scanning mirror 432 may scan in one dimension through first angular extents with a first angular offset as a result of being driven by a first control signal, and scanning mirror 442 may scan in a second dimension through second angular extents with a second angular offset as a result of being driven by a second control signal. In some embodiments, the instantaneous angular deflection of scanning devices 430 and 440 are independently controlled, resulting in a completely configurable field of view along with configurable scan rates.

Although scanning mirror assembly 428 is shown as two mirrors, where each scans in a separate dimension, this is not a limitation of the present invention. For example, in some embodiments, scanning mirror assembly 428 is implemented using a single biaxial mirror that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning devices 430, 440 include one or more sensors to detect the angular position or angular extents of the mirror deflection (in one or both dimensions). For example, in some embodiments, scanning mirror 432 includes a piezoresistive sensor that delivers a voltage that is proportional to the deflection of the mirror in the fast-scan direction. Further, in some embodiments, scanning mirror 442 includes an additional piezoresistive sensor that delivers a voltage that is proportional to the deflection of the mirror in the slow-scan direction. In some embodiments, the mirror position information is provided back to transmit mirror driver 350 to allow phase locked operation. In these embodiments, transmit mirror driver 350 includes one or more feedback loops to modify the drive signals in response to the measured angular deflection of the mirror.

Exit optical devices 450 operate on the scanning pulsed fanned laser beam as it leaves the transmit module. In some embodiments, exit optical devices 450 perform field expansion. For example, scanning mirror assembly 428 may scan through maximum angular extents of 20 degrees in the fast-scan direction, and may scan through maximum angular extents of 40 degrees in the slow-scan direction, and exit optical devices 450 may expand the field of view to 30 degrees in the fast-scan direction and 120 degrees in the slow-scan direction. The relationship between scan angles of scanning mirrors and the amount of field expansion provided by exit optical devices 450 is not a limitation of the present invention.

In some embodiments, laser diodes 512, 514, 516, and 516 are high power multimode laser diodes. Multimode laser diodes typically have relatively large emitter areas that result in a beam that diverges faster on one axis than on the other axis. For example, an example 905 nm multimode laser diode may have a 10 um emitter oriented in the fast-scan direction and a 220 um emitter oriented in the slow-scan direction resulting in an emitted beam that inherently diverges faster in the slow-scan direction. Various embodiments take advantage of this non-uniform beam shape by collimating the beam in the direction that naturally diverges more slowly, and focusing or expanding the beam into a fan in the direction that naturally diverges more quickly.

As shown in FIG. 5, fanned beams 534 and 544 are fed to scanning mirror assembly 428 at different angles. The difference between these angles is referred to as the "relative beam angle." As a result, the scanned fanned beams 560 and 570 emerge from scanning mirror assembly 428 with the same relative beam angle. For example, fanned beams 534 and 544 may be fed to scanning mirror assembly 428 with a relative beam angle substantially equal to the angular divergence of each beam, thereby effectively doubling the fan angle of the resulting scanned fanned beam. Also for example, beams 534 and 544 may be fed to scanning mirror assembly 428 with a relative beam angle less than the angular divergence of each beam, thereby increasing the overlap of the beams 560 and 570, and increasing the fan angle of the resulting scanned fanned beam to a lesser extent.

FIGS. 4 and 5 show the angular offset having a non-zero component in the slow-scan direction and no component in the fast-scan direction. This results in a non-zero relative beam angle in the scanned beams 560, 570 only in the slow-scan direction. Some embodiments include non-zero relative beam angles in both scan directions, resulting in non-zero relative beam angles in the scanned beams 560, 570 in both the slow-scan direction and the fast-scan direction.

FIG. 5 shows only two light beams 534, 544 being fed to a scanning mirror assembly with a non-zero relative beam angle to increase the emitted laser light power, although this is not a limitation of the present invention. For example, in some embodiments, three or more light beams are fed to a scanning mirror with non-zero relative beam angles to increase the emitted laser light power. Further, each of light beams 534, 544 is shown being generated by combining laser light from two laser diodes using polarization beam combining techniques, although this is not a limitation of the present invention. For example, in some embodiments, each of light beams 534, 544 is generated from a single laser diode, and in other embodiments, each of light beams 534, 544 is generated using spectral beam combining techniques using dichroic surfaces.

Figure 6:
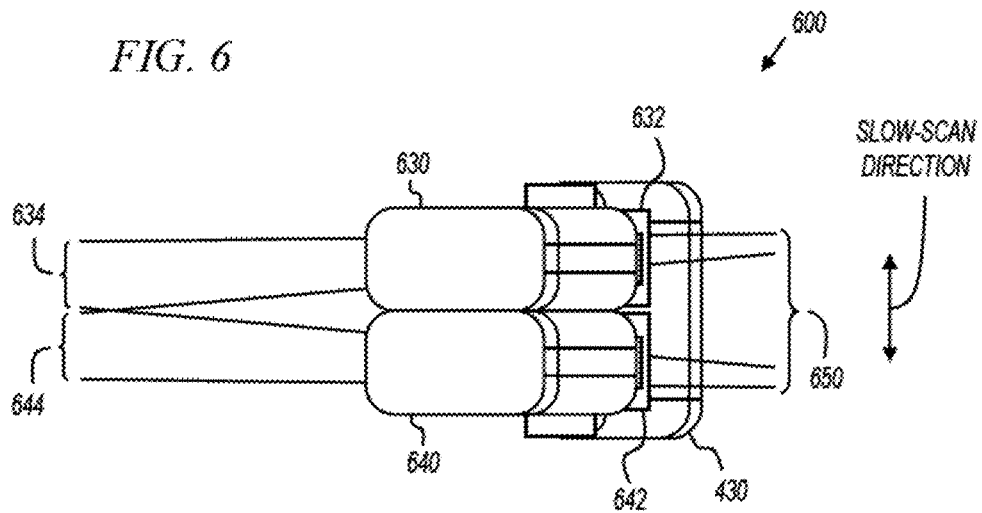
FIG. 6 shows a top view of a scanning mirror assembly in accordance with various embodiments of the present invention.
Figure 7:
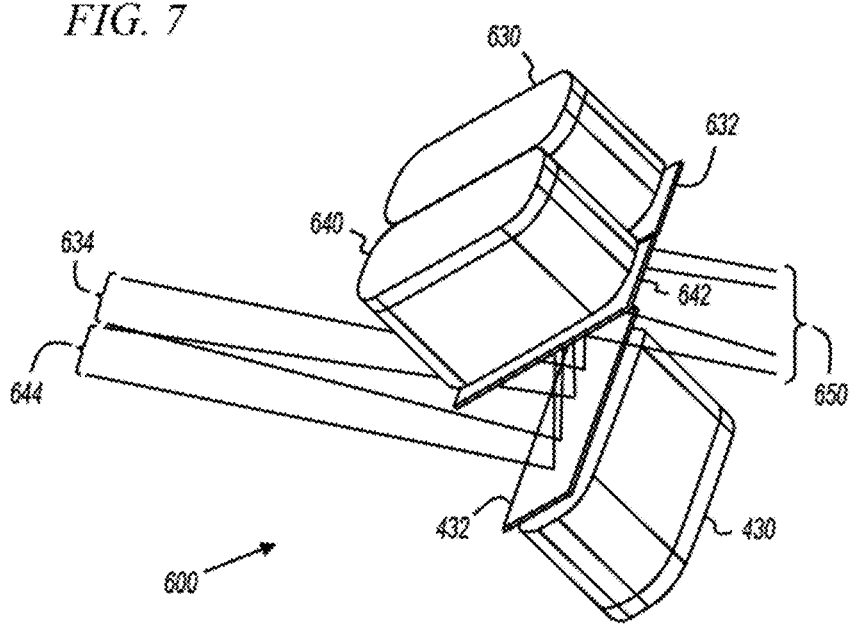
FIG. 7 shows a perspective view of the scanning mirror assembly of FIG. 6 in accordance with various embodiments of the present invention.

FIG. 6 shows a top view and FIG. 7 shows a perspective view of a scanning mirror assembly in accordance with various embodiments of the present invention. In some embodiments, scanning mirror assembly 600 is used in a transmit module. For example, in some embodiments, scanning mirror assembly 600 may be used in place of scanning mirror assembly 428 (FIGS. 4, 5). Incoming fanned beams 634 and 644 may be generated by combining laser light from multiple sources. For example, in some embodiments, incoming fanned beams 634 and 644 correspond to beams 534 and 544 (FIGS. 4, 5), respectively. Scanning mirror assembly 600 includes one single-axis scanning device 430 with a scanning mirror 432 to scan the incoming fanned beams in the vertical, fast-scan direction. Scanning mirror assembly 600 also includes two single-axis scanning devices 630 and 640, each having a scanning mirror 632, 642, to scan the incoming fanned beams in the horizontal, slow-scan direction.

In embodiments represented by FIGS. 6 and 7, incoming fanned beams 634 and 644 are fed to scanning mirror assembly 600 with a non-zero relative beam angle in the slow-scan direction, and each scanning mirror reflects light from both incoming light beams 634, 644. For example, scanning mirror 632 reflects light from a first portion of fanned beam 634 and a first portion of fanned beam 644 in the horizontal direction. Also for example, scanning mirror 642 reflects light from a second portion of fanned beam 634 and a second portion of fanned beam 644 in the horizontal direction. As a result, scanned fanned beam 650 has beams 634 and 644 at a fixed angular relationship as its constituent beams.

In some embodiments, scanning devices 630 and 640 are driven with common signals from control circuit 140 (FIG. 1), and in other embodiments, scanning devices 630 and 640 are driven with different signals from control circuit 140. For example, scanning devices 630 and 640 may be driven to have identical angular extents and/or angular offsets, or may be driven to have different angular extents and/or angular offsets.

Figure 8:
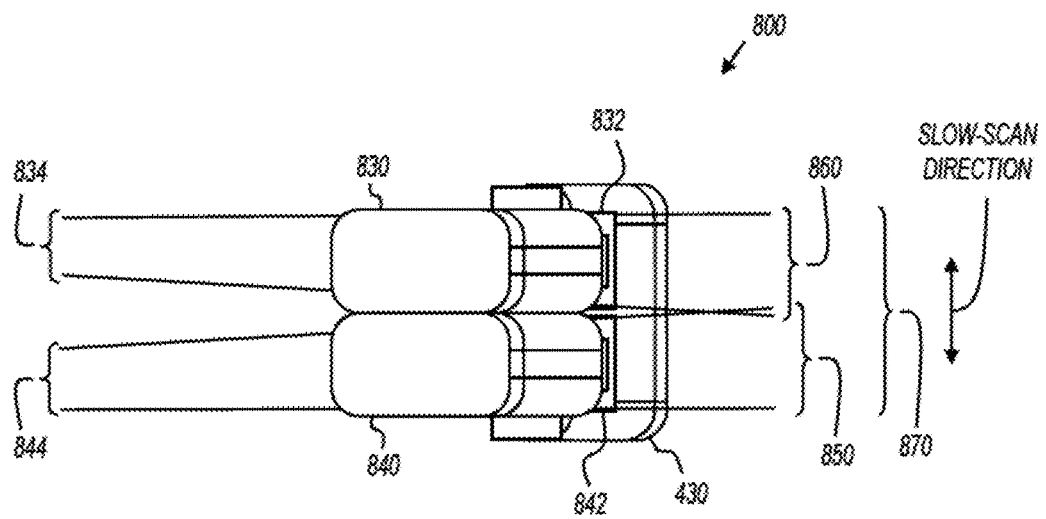
FIG. 8 shows a top view of a scanning mirror assembly in accordance with various embodiments of the present invention.
Figure 9:
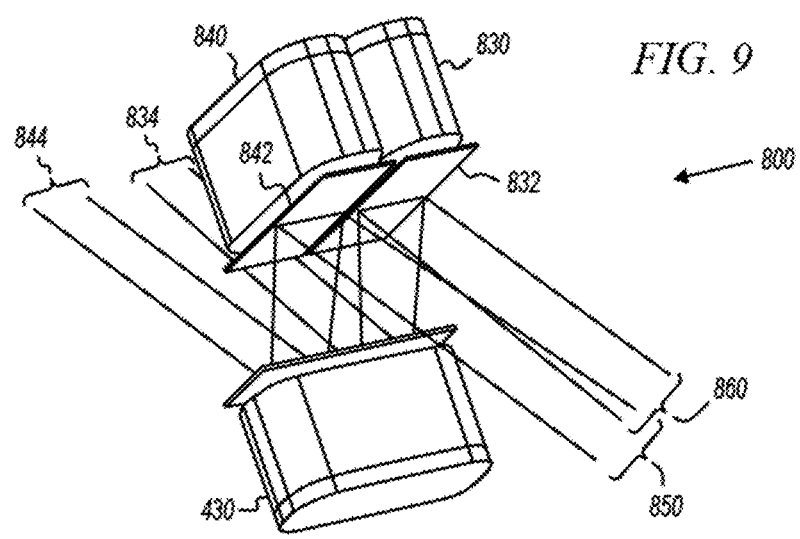
FIG. 9 shows a perspective view of the scanning mirror assembly of FIG. 8 in accordance with various embodiments of the present invention.

FIG. 8 shows a top view and FIG. 9 shows a perspective view of a scanning mirror assembly in accordance with various embodiments of the present invention. In some embodiments, scanning mirror assembly 800 is used in a transmit module. For example, in some embodiments, scanning mirror assembly 800 may be used in place of scanning mirror assembly 428 (FIGS. 4, 5). Incoming fanned beams 834 and 844 may be generated by combining laser light from multiple sources. For example, in some embodiments, incoming fanned beams 834 and 844 correspond to beams 534 and 544 (FIGS. 4, 5), respectively. Scanning mirror assembly 800 includes one single-axis scanning device 430 with a scanning mirror 432 to scan the incoming fanned beams in the vertical, fast-scan direction. Scanning mirror assembly 800 also includes two single-axis scanning devices 830 and 840, each having a scanning mirror 832, 842, to scan the incoming fanned beams in the horizontal, slow-scan direction.

In embodiments represented by FIGS. 8 and 9, incoming fanned beams 834 and 844 are fed to scanning mirror assembly 800 with a non-zero relative beam angle in the slow-scan direction, and each of scanning mirrors 832, 842 reflects light from a corresponding one of incoming light beams 834, 844. For example, scanning mirror 832 reflects light from incoming fanned beam 834 in the horizontal direction, and scanning mirror 842 reflects light from incoming fanned beam 844 in the horizontal direction. As a result, when scanning mirrors 832, 842 are driven to have the same angular offset (zero relative offset between the two mirrors), the scanned fanned beam 870 has beams 850 and 860 at a fixed angular relationship equal to the relative beam angle of incoming fanned beams 834 and 844.

In some embodiments, scanning devices 830 and 840 are driven with common signals from control circuit 140 (FIG. 1), and in other embodiments, scanning devices 830 and 840 are driven with different signals from control circuit 140. For example, scanning devices 830 and 840 may be driven to have identical angular extents and/or angular offsets, or may be driven to have different angular extents and/or angular offsets.

In some embodiments, the angular relationship between output beams 850 and 860 in the slow-scan direction is controlled by modifying the angular offset of one or both of scanning mirrors 832 and 842. For example, varying the relative angular offset between the two mirrors changes the angular relationship between the output beams, resulting in more or less overlap of the beams at a given range in the field of view. Increased overlap of the beams at a given range provides an increase emitted light power over a smaller fan angle. Likewise, reduced overlap of the beams at a given range provides reduced emitted light power over a larger fan angle. In some embodiments, this is accomplished by control circuit 140 driving scanning mirror devices 830, 840 at identical amplitudes and frequencies, and with different angular offsets.

Figure 10:
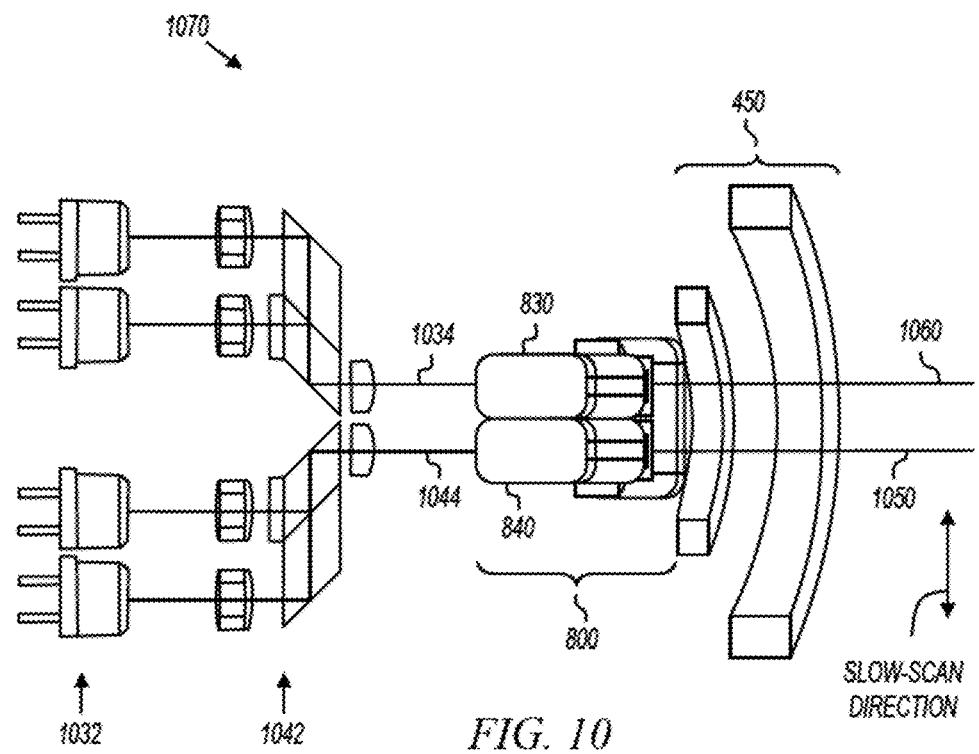
FIG. 10 shows a top view of a transmit module in accordance with various embodiments of the present invention.
Figure 11:
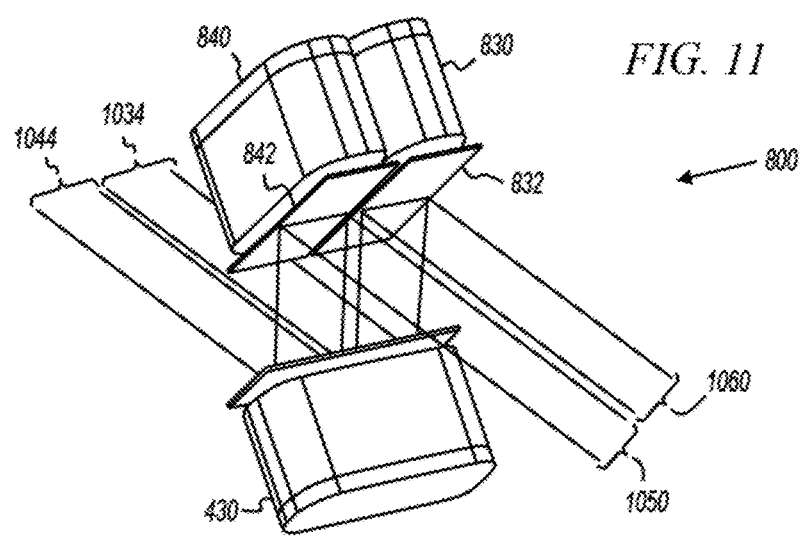
FIG. 11 shows a perspective view of the scanning mirror assembly of FIG. 10 in accordance with various embodiments of the present invention.

FIG. 10 shows a top view of a transmit module and FIG. 11 shows a perspective view of the scanning mirror assembly of FIG. 10 in accordance with various embodiments of the present invention. Transmit module 1070 is an example embodiment of transmit module 110 (FIG. 1). Transmit module 1070 includes laser light source 1032, beam shaping optical devices 1042, scanning mirror assembly 800, and exit optical devices 450. Scanning mirror assembly 800 and exit optical devices 450 are described above.

In some embodiments, laser light source 1032 is implemented using laser light sources 410 (FIGS. 4, 5), and beam shaping optical devices 1042 are implemented using beam shaping optical devices 420 (FIGS. 4, 5) with the only difference being their relative orientations. For example, as shown in FIG. 10, laser light source 1032 and beam shaping optical devices 1034 are oriented such that the fanned beams 1034 and 1044 have a zero relative beam angle in the slow-scan direction.

In some embodiments, each of beams 1034 and 1044 may be collimated in the fast-scan direction with <0.2 degrees of divergence, and may be focused or expanded in the slow-scan direction to diverge at a rate that produces a fan angle of substantially four degrees. Beam sizes and divergence values are not necessarily uniform across the various embodiments of the present invention; some embodiments have higher values, and some embodiments have lower values.

In embodiments represented by FIGS. 10 and 11, fanned beams 1034 and 1044 are fed to scanning mirror assembly 800 with a zero relative beam angle (parallel) in the slow-scan direction, and each of scanning mirrors 832, 842 reflects light from a corresponding one of incoming light beams 1034, 1044. For example, scanning mirror 832 reflects light from incoming fanned beam 1034 in the horizontal direction, and scanning mirror 842 reflects light from incoming fanned beam 1044 in the horizontal direction. As a result, when scanning mirrors 832, 842 are driven to have the same angular offset (zero relative offset between the two mirrors), the scanned fanned output beams 1050 and 1060 exhibit the same angular relationship as incoming fanned beams 1034 and 1044.

In some embodiments, scanning devices 830 and 840 are driven with common signals from control circuit 140 (FIG. 1), and in other embodiments, scanning devices 830 and 840 are driven with different signals from control circuit 140. For example, scanning devices 830 and 840 may be driven to have identical angular extents and/or angular offsets, or may be driven to have different angular extents and/or angular offsets.

In some embodiments, the angular relationship between output beams 1050 and 1060 in the slow-scan direction is controlled by modifying the angular offset of one or both of scanning mirrors 832 and 842. For example, varying the relative angular offset between the two mirrors changes the angular relationship between the output beams, resulting in more or less overlap of the beams at a given range in the field of view. Increased overlap of the beams at a given range provides an increase emitted light intensity over a smaller fan angle. Likewise, reduced overlap of the beams at a given range provides reduced emitted light power over a larger fan angle. In some embodiments, this is accomplished by control circuit 140 driving scanning mirror devices 830, 840 at identical amplitudes and frequencies, and with different angular offsets.

FIGS. 10 and 11 show only two light beams 1034, 1044 being fed to a scanning mirror assembly, although this is not a limitation of the present invention. For example, in some embodiments, three or more light beams are fed to a scanning mirror assembly, where each light beam is scanned in the slow-scan direction by a separate scanning mirror.

FIGS. 12 and 13 show beam combining and fan angle control in accordance with various embodiments of the present invention. FIGS. 12 and 13 show a transmit module 1002 having scanning mirror assembly 800. As shown in FIGS. 12 and 13, transmit module 1002 scans a combined output beam 1003, which includes output beam 1005 and 1007. In some embodiments, transmit module 1002 in an implementation of transmit module 400 (FIG. 4) that includes scanning mirror assembly 800 (FIGS. 8, 9) to allow control of overlap of scanned fanned output beams. Further, in some embodiments, transmit module 1002 in an implementation of transmit module 1070 (FIG. 10) that includes scanning mirror assembly 800 (FIGS. 10, 11) to allow control of overlap of scanned fanned output beams. Accordingly, in some embodiments, output beams 1005 and 1007 represent output beams 850 and 860 (FIGS. 8, 9), and in other embodiments, output beams 1005 and 1007 represent output beams 1050 and 1060 (FIGS. 10, 11).

Section A-A of FIG. 12 and section B-B of FIG. 13 show cross sections of output beams 1005 and 1007 for different relative angular offsets between scanning mirrors 832, 842 (FIGS. 8-11). The shape of fanned beam 1005 is defined in part by a major axis 1010, a minor axis 1012, and a fan angle, and the shape of fanned beam 1007 is defined in part by a major axis 1020, a minor axis 1022, and a fan angle. The fan angle of fanned beam 1005 results in a fan width 1014 at a given distance, and the fan angle of fanned beam 1007 results in a fan width 1024 at the same distance. The terms "fan angle" and "fan width" are used somewhat interchangeably, since they vary proportionally at any given distance. The terms "major axis" and "minor axis" as used herein, do not refer to a mirror axis, a pivot axis, or an axis of rotation; rather, these terms refer to the shape of fanned beams in the field of view.

Although major axes 1010, 1020 are oriented parallel to the slow-scan direction, and minor axes 1012, 1022 are oriented parallel to the fast-scan direction, this is not a limitation of the present invention. For example, in some embodiments, major axes 1010, 1020 are oriented parallel to the fast-scan direction, and minor axes 1012, 1022 are oriented parallel to the slow-scan direction.

Major axis 1010 of fanned beam 1005 and major axis 1020 of fanned beam 1007 are substantially coincident. Minor axis 1012 of fanned beam 1005 and minor axis 1022 of fanned beam 1007 are substantially parallel, but not necessarily coincident. In some embodiments, the overlap of fanned beams 1005 and 1007, and therefore the distance between minor axes 1012, 1022 is varied by modifying the relative angular offset between scanning mirrors 832, 842. The combined fan angle varies as a result. For example, as shown in FIG. 12, the combined fan angle (represented by fan width 1030) may be made relatively large, and as shown in FIG. 13, the combined fan angle (represented by fan width 1130) may be made smaller, all by modifying the relative angular offset between scanning mirrors.

In some embodiments, the amount of overlap of fanned beams is adaptively modified. For example, when increased emitted laser light per unit area is desired, the amount of overlap may be increased as shown in FIG. 13. Also for example, when a larger fan angle is desired, the amount of overlap may be decreased as shown in FIG. 12. Adaptive modification may be performed in response to any internal or environmental variable. For example, in some embodiments, the amount of overlap may be adaptively modified as a function of vehicle speed, and in other embodiments, the amount of overlap may be adaptively modified in response to modifications in the field of view.

Figure 14:
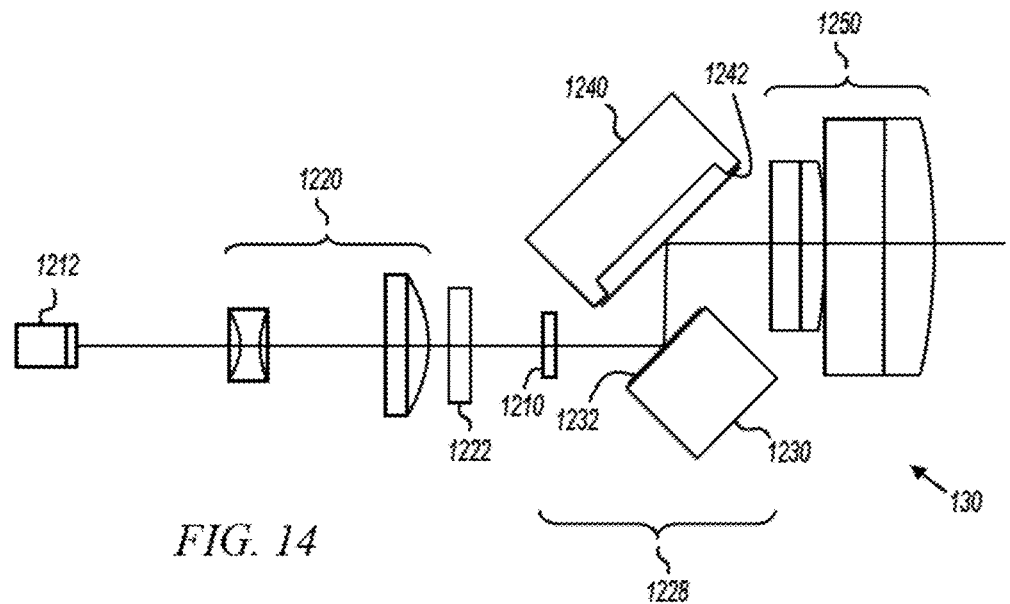
FIG. 14 shows a side view of a receive module in accordance with various embodiments of the present invention.
Figure 15:
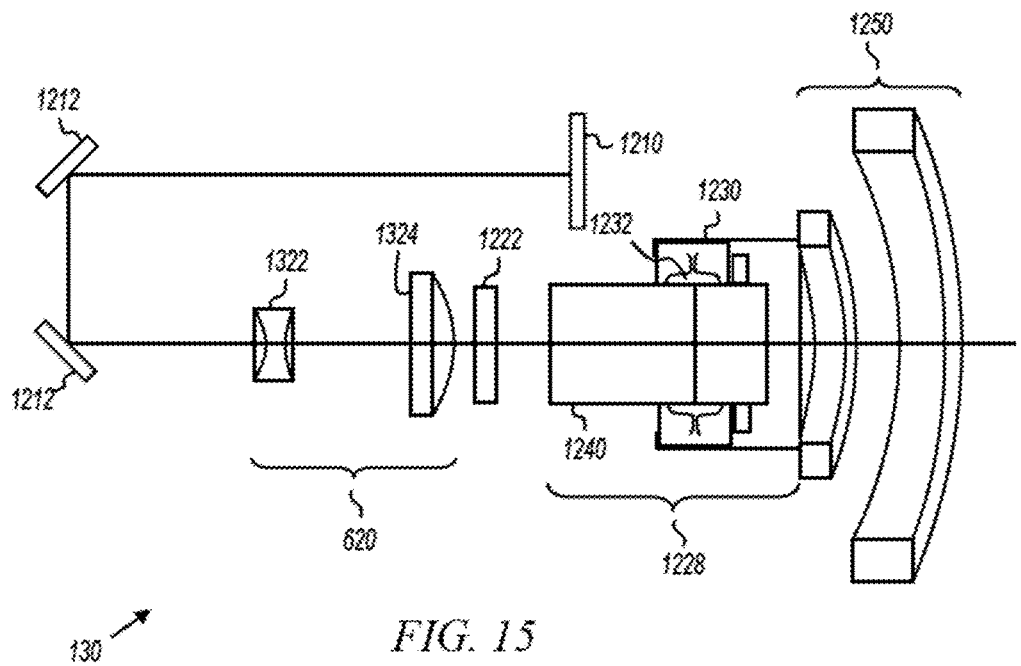
FIG. 15 shows a top view of a receive module in accordance with various embodiments of the present invention.

FIG. 14 shows a side view and FIG. 15 shows a top view of a receive module in accordance with various embodiments of the present invention. Receive module 130 includes arrayed receiver 1210, fold mirrors 1212, imaging optical devices 1220, bandpass filter 1222, scanning mirror assembly 1228, and exit optical devices 1250.

Scanning devices 1230 and 1240 are similar or identical to scanning devices 430 and 440, and exit optical devices 1250 are similar or identical to exit optical devices 450. Bandpass filter 1222 passes the wavelength of light that is produced by laser light source 410, and blocks ambient light of other wavelengths. For example, in some embodiments, laser light source 410 produces light at 905 nm, and bandpass filter 1222 passes light at 905 nm.

Imaging optical devices 1220 image a portion of the field of view onto arrayed receiver 1210 after reflection by fold mirrors 1212. For example, in some embodiments, optical devices 1220 image the aperture 126 (FIG. 1) onto arrayed receiver 1210. Because scanning mirror assembly 1228 is scanned synchronously with scanning mirror assembly 428, arrayed receiver 1210 always collects light from the measurement points illuminated by the scanned pulsed fanned beam.

Arrayed receiver 1210 includes an array of light sensitive devices. The array of light sensitive devices may be one-dimensional or two-dimensional. For example, in some embodiments, arrayed receiver 1210 includes a 1×M array of PIN photodiodes, Silicon photomultipliers (SiPM), avalanche photodiodes (APD), or the like, where M is any integer. Also for example, in some embodiments, arrayed receiver 1210 includes a N×M array of PIN photodiodes, Silicon photomultipliers (SiPM), avalanche photodiodes (APD), or the like, where N and M are any integers. Any number of light sensitive devices may be included without departing from the scope of the present invention. For example, in some embodiments, 16 light sensitive devices are included, and in other embodiments, 24 light sensitive devices are included.

Figure 16:
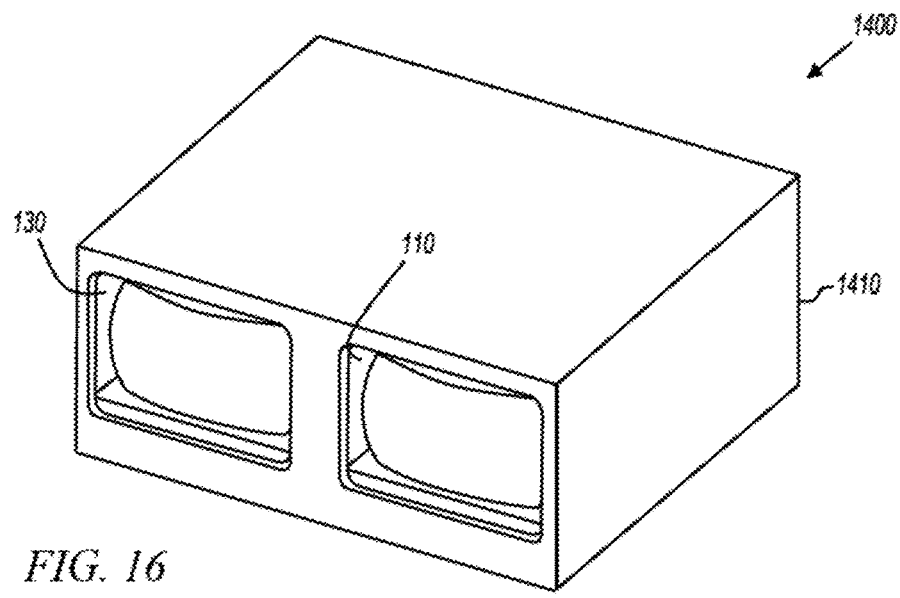
FIG. 16 shows a perspective view of an integrated photonics module in accordance with various embodiments of the present invention.

FIG. 16 shows a perspective view of an integrated photonics module in accordance with various embodiments of the present invention. Integrated photonics module 1400 is shown having a rectangular housing 1410 with transmit module 110 and receive module 130 placed side by side. In some embodiments, transmit module 110 and receive module 130 are placed one on top of the other. The relative orientation of transmit module 110 and receive module 130 is not a limitation of the present invention.

Figure 17:
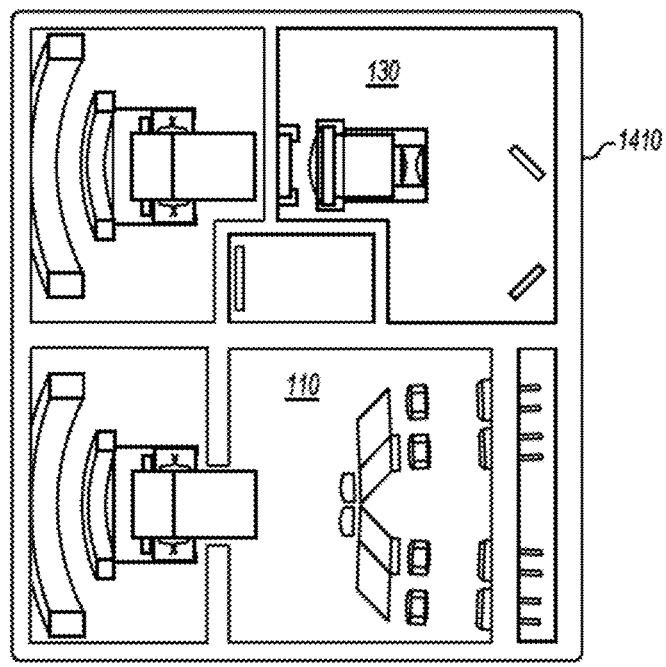
FIG. 17 shows a cross sectional top view of the integrated photonics module of FIG. 16.
Figure 18:
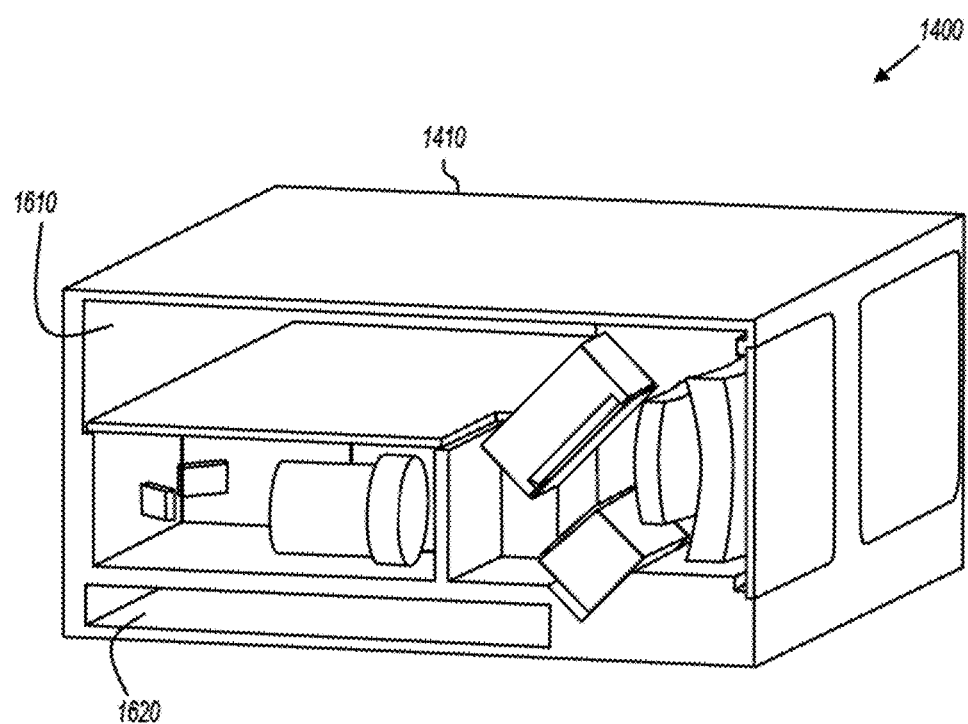
FIG. 18 shows a cross sectional perspective view of the integrated photonics module of FIG. 16.

FIG. 17 shows a cross sectional top view and FIG. 18 shows a cross sectional perspective view of the integrated photonics module of FIG. 16. Transmit module 110 and receive module 130 are shown side by side. In some embodiments, space is provided for electronics above (1610) and below (1620) the rearmost optical devices in integrated photonics module 1400. Any amount of system electronics may be included within module 1400. For example, in some embodiments, all components shown in FIG. 1 are included in module 1400. Also for example, in some embodiments, only control circuits and TOF measurement circuits are included in module 1400.

Figure 19:
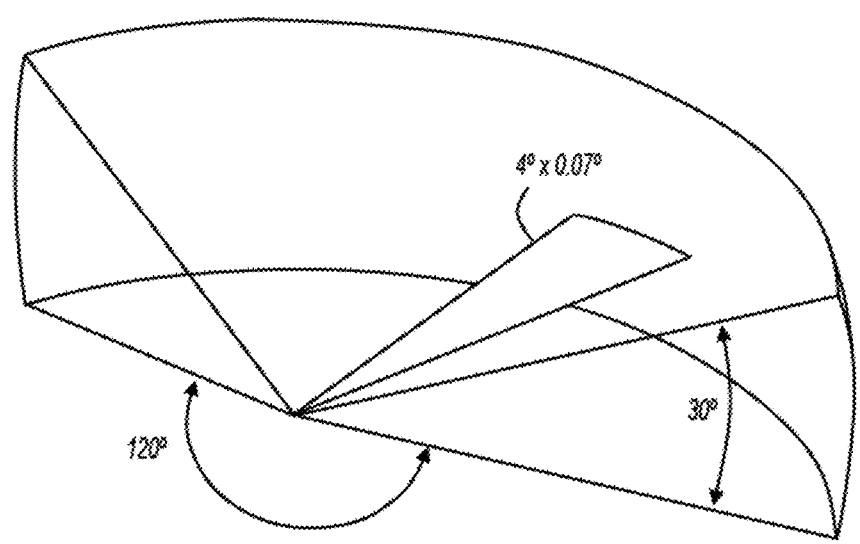
FIG. 19 shows a fanned beam in a field of view in accordance with various embodiments of the present invention.

FIG. 19 shows a fanned beam in a field of view in accordance with various embodiments of the present invention. The field of view in the example of FIG. 19 spans 120 degrees horizontally and 30 degrees vertically. This corresponds to the example provided with reference to FIG. 4 in which the transmit module exit optics expand the field of view to 120 degrees by 30 degrees. The pulsed fanned laser beam in FIG. 19 is four degrees in the horizontal direction and 0.07 degrees on the vertical axis. In some embodiments, the pulsed fanned laser beam has a fan angle greater than four degrees, and in other embodiments, the pulsed fanned laser beam has a fan angle less than four degrees. Further in some embodiments, the pulsed fanned laser beam is taller than 0.07 degrees, and in other embodiments, the pulsed fanned laser beam is shorter than 0.07 degrees.

As described above, the fanned beam is scanned in two dimensions in the field of view. The fast-scan direction is usually, but not necessarily, oriented vertically, and the slow-scan direction is usually, but not necessarily, oriented horizontally. The scan frequency in the slow-scan direction relative to the scan frequency in the fast-scan direction determines the number of fast scan passes per slow scan pass. Each slow scan pass is referred to herein as a "frame." The ratio of width (in degrees of field of view) of the fast scan cycle to laser beam fan angle determines the number of frames per complete scene acquisition.

The field of view may be run at a reduced angle relative to the maximum operating point by modifying angular extents. This can be used to alter the ratio of fast scan cycle width (in degrees field of view to laser beam fan angle and the resulting scan/fill pattern of the TOF pulses. Furthermore, due to the completely non-resonant drive scanning mirror system design, a pointing angle offset may be applied in two dimensions by modifying angular offsets to shift the reduced imaging area inside the accessible scene.

In some embodiments, the fan angle of the fanned beam may be modified. For example, by modifying the relative angular offset of scanning mirrors that scan in the horizontal direction the fanned beam angle may be increased by decreasing the overlap of multiple fanned beams, or may be decreased by increasing the overlap of multiple fanned beams.

Figure 20:
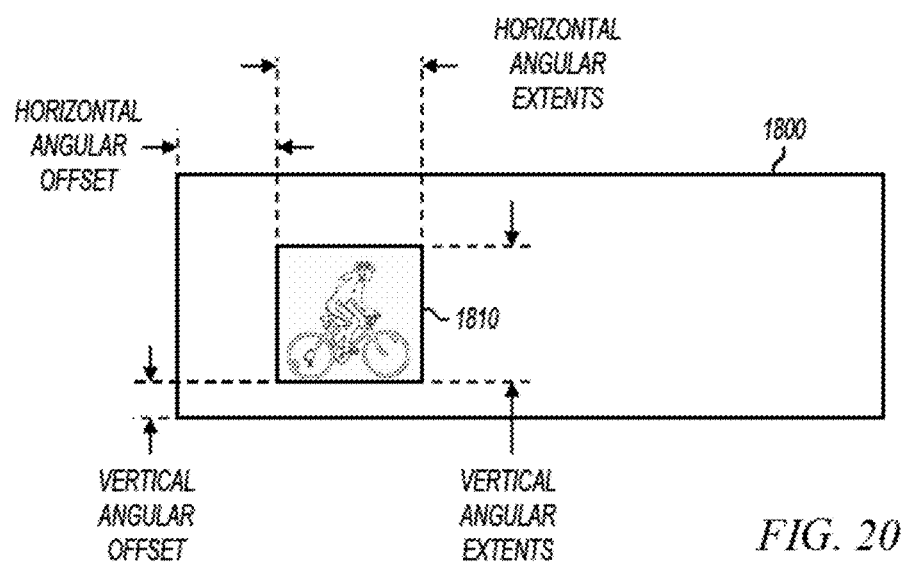
FIG. 20 shows a modified field of view for object tracking in accordance with various embodiments of the present invention.

FIG. 20 shows a modified field of view for object tracking in accordance with various embodiments of the present invention. Field of view 1800 represents the maximum field of view attainable by the LIDAR system. Field of view 1810 represents a modified field of view. Modified field of view 1810 has reduced angular extents of mirror deflection in both the fast-scan direction and slow-scan direction, and also has nonzero angular offsets in both the fast and slow-scan directions. In some embodiments, the modified angular extents and offsets are produced by control circuit 140 to track an object that has identified by computer vision processing 170. In other embodiments, the modified angular extents and offsets are produced by control circuit 140 in response to other input data In embodiments represented by FIG. 20, the angular offsets are shown referenced to the edge of field of view 1800, although this is not a limitation of the present invention. For example, the angular offsets may be referenced to the mirror relaxation point in the center of the field of view.

Figure 21:
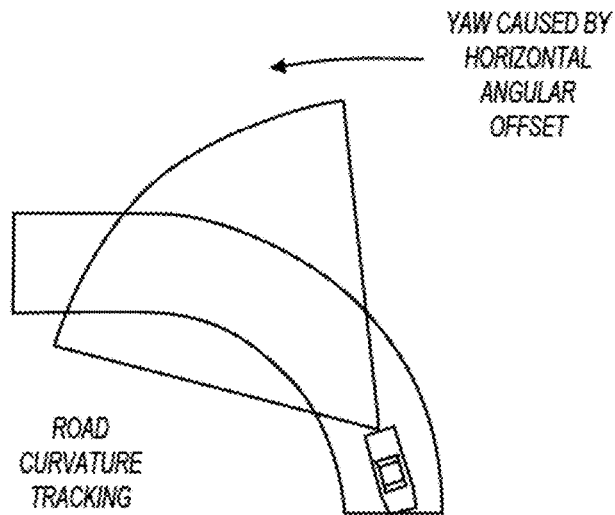
FIG. 21 shows a modified field of view for road curvature tracking in accordance with various embodiments of the present invention.

FIG. 21 shows a modified field of view for road curvature tracking in accordance with various embodiments of the present invention. The example of FIG. 21 demonstrates the effect of a non-zero angular offset in the horizontal direction with or without a nonzero angular offset in the vertical direction. In some embodiments, a road curvature is tracked by computer vision processing 170, and control circuit 140 modifies the field of view in response.

Figure 22:
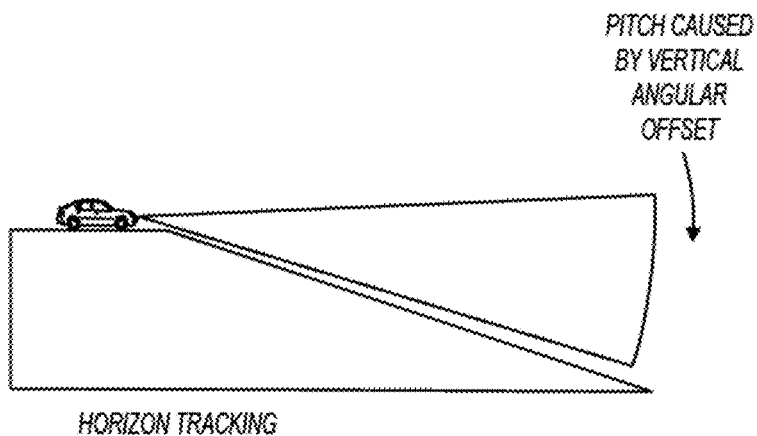
FIG. 22 shows a modified field of view for horizon tracking in accordance with various embodiments of the present invention.

FIG. 22 shows a modified field of view for horizon tracking in accordance with various embodiments of the present invention. The example of FIG. 22 demonstrates the effect of a nonzero angular offset in the vertical direction with or without a nonzero angular offset in the horizontal direction. In some embodiments, a horizon is tracked by computer vision processing 170, and control circuit 140 modifies the field of view in response.

In some embodiments, a similar approach is used for bump correction, stabilizing the field of view so that captured points from the scene do not need to be cropped or adjusted relative to the calibrated angular perspective relative to the driving surface and ego vehicle.

Figure 23:
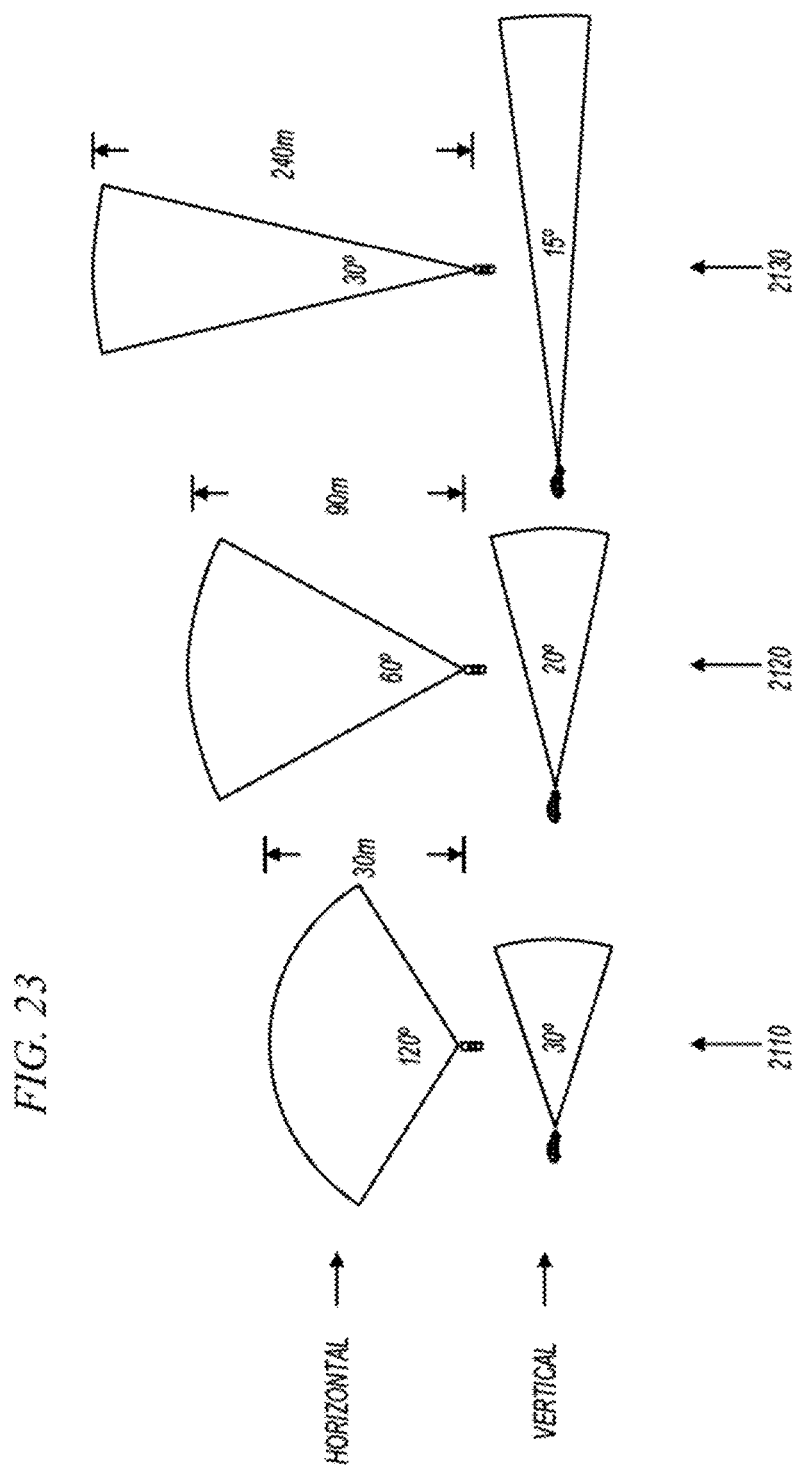
FIG. 23 shows adjustable angular extents and distance of interest control in accordance with various embodiments of the present invention.

FIG. 23 shows adjustable angular extents and distance of interest control in accordance with various embodiments of the present invention. FIG. 23 shows three different scenarios, each of which includes different horizontal and vertical angular extents. In operation, any number of scenarios is possible, limited only by the resolution which the angular extents may be modified.

Scenario 2110 represents the maximum field of view for the nominal design case with a horizontal field of view of 120 degrees and a vertical field of view of 30 degrees. The various embodiments of the present invention are not limited to this nominal design case, as in some embodiments, the maximum field of view is larger than 120 degrees by 30 degrees, and in other embodiments, the maximum field of view is smaller than 120 degrees by 30 degrees.

Scenario 2120 shows a modified field of view. The horizontal angular extents have been reduced to 60 degrees and the vertical angular extents have been reduced to 20 degrees. Scenario 2130 shows a further modified field of view. The horizontal angular extents have been further reduced to 30 degrees and the vertical angular extents have been further reduced to 15 degrees.

Reducing the angular extents as shown in FIG. 23 allows the system to increase the distance of interest without loss to angular resolution. As used herein, the term "distance of interest" refers to a distance at which the LIDAR system is imaging the scene. For example, in scenario 2110, the distance of interest may be about 30 meters (m), in scenario 2120 the distance of interest may be about 90 m, and in scenario 2130, the distance of interest may be about 240 m. In each of these scenarios, other system properties may be modified to support imaging at the distance of interest. For example, laser power may be increased, pulse rate may be decreased, and the like. Also for example, the scanned beam fan angle may be increased or decreased to support imaging at the distance of interest.

Figure 24:
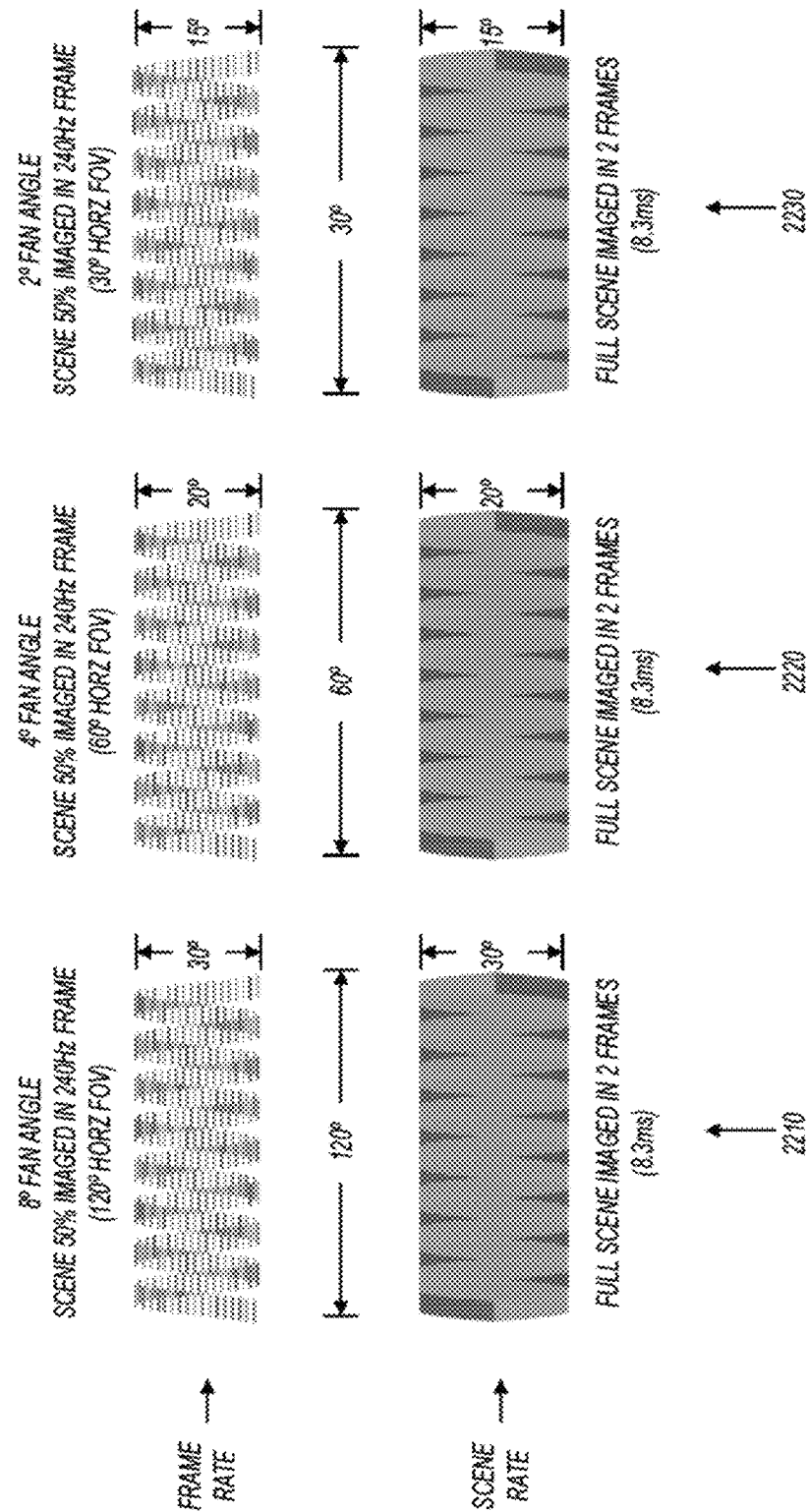
FIG. 24 shows scene imaging scenarios in accordance with various embodiments of the present invention.

FIG. 24 shows scene imaging scenarios in accordance with various embodiments of the present invention. As the field of view is reduced as shown in FIG. 23, the rate at which the entire scene is scanned may change. As used herein the term "scene rate" refers to the rate at which the entire scene is imaged. The scene rate may be as high as the frame rate when a single slow-scan pass images the entire scene, or the scene rate may be lower than the frame rate when multiple slow-scan passes are required to image the entire scene. In some embodiments, a "super-resolution" scheme is employed by adding phase offsets to the fast axis scan in subsequent frames to fill in the entire scene when scene rate is lower than the frame rate.

The top half of FIG. 24 shows imaging coverage in a single frame for various fields of view and beam fan angles, and the bottom half of FIG. 24 shows the number of frames necessary to image the entire scene. The field of view in scenario 2210 corresponds to the field of view in scenario 2110 (FIG. 23), the field of view in scenario 2220 corresponds to the field of view in scenario 2120 (FIG. 23), and the field of view in scenario 2230 corresponds to the field of view in scenario 2130 (FIG. 23).

As shown in scenario 2210, in embodiments with 120 degree maximum horizontal field of view, an eight degree scanned beam fan angle, and an active ratio of eight fast-scan cycles to one slow-scan cycle, two frames need elapse to image a full scene (with some small overlap) via phase-staggered super-resolution. Given a native frame rate of 240 Hz, the full scene would then be imaged (scene rate) at 120 Hz, over the complete 120 degree horizontal field of view.

As shown in scenario 2220, the horizontal field of view is reduced by one half (to 60 degrees) while commanding a four degree scanned beam fan angle. In this scenario, two frames still need elapse to completely image the scene, and the scene rate is maintained at 120 Hz.

As shown in scenario 2230, the horizontal field of view is reduced by half again (to 30 degrees), and the scanned beam fan angle is reduced to two degrees. In this scenario, two frames still need elapse to completely image the scene. Note that if, in this scenario, the scanned beam fan angle is maintained at four degrees, the entire scene can be imaged at the native 240 Hz rate, and the scene rate will equal the frame rate.

In some embodiments, the point cloud is updated at the scene rate. For example, the point cloud data in storage 160 (FIG. 1) may be updated each time the entire scene is imaged. Accordingly, as the horizontal field of view is reduced, the point cloud update rate may be increased, leading to faster computer vision processing updates, and potentially faster object recognition, lane tracking, and the like.

Because of this relationship between horizontal field of view reduction and increased update rate, latency in point cloud processing and perception layers may be reduced as the distance of interest is increased. Alternatively, the update rate may be maintained, and the additional scene acquisitions associated with reduced horizontal field of view at increased distances of interest may be used to increase signal-to-noise ratio (SNR) via averaging. In some embodiments, this may include a simple box averaging scheme or may use a more advanced form of spatio-temporal Bayesian filtering.

Figure 25:
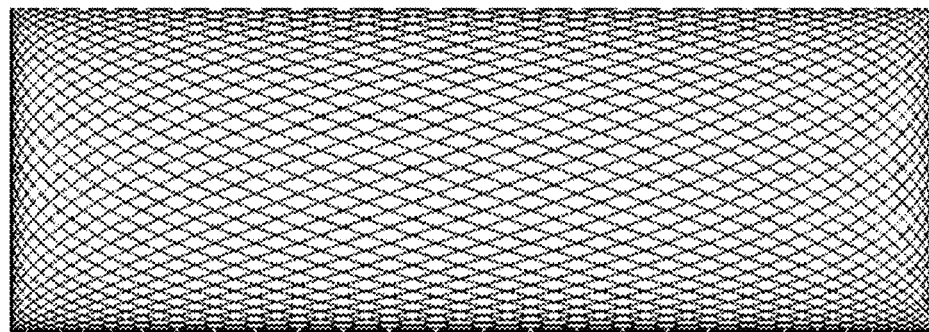
FIG. 25 shows example adaptive operating modes in accordance with various embodiments of the present invention.

FIG. 25 shows example adaptive operating modes in accordance with various embodiments of the present invention. In the example adaptive modes of FIG. 25, angular extents, laser pulsing parameters, and scanned beam fan angle are adaptively modified based on vehicle speed. In some embodiments, the adaptive modes are software controlled as the vehicle speed changes and in other embodiments, the adaptive modes are under hardware control. For example, referring now back to FIG. 3, in some embodiments, the extents, offsets, and laser pulsing parameters are modified under software control in response to vehicle sensor inputs. Also for example, in some embodiments, the extents, offsets, and laser pulsing parameters are modified under hardware control by digital logic 330 in response to vehicle sensor inputs. Further, the adaptive scenarios under hardware control may be software configurable such that the extents, offsets, and laser pulsing parameters as a function of vehicle sensor inputs are established under software control and then subsequently modified real-time under hardware control.

The notion of collapsing the active field of view and increasing the distance of interest with increasing vehicle speed naturally mimics that of a human driver's visual/mental processing. A vehicle traveling quickly will need more time for braking or maneuvering when an avoidance event occurs, so the gaze naturally goes out to allow for awareness to focus on objects in the far field. A stationary or slow-moving vehicle, on the other hand, need not focus on objects far away, but instead utilizes a greater field of view to safely interact with objects on the near/side periphery which at this speed may interact with the vehicle.

FIG. 26 shows alternate scanning patterns in the field of view in accordance with various embodiments of the present invention. Scanning pattern 1800 includes sinusoidal scanning on both the fast axis and the slow axis. One advantage of sinusoidal scanning is the narrow control bandwidth used to control such trajectories. Some embodiments use purely sinusoidal scanning as shown in FIG. 26, and other embodiments use a small number of harmonics to approach a ramp while still limiting the control bandwidth necessary to control mirror movement. In general, any scanning trajectory may be used without departing from the scope of the present invention.

Figure 27:
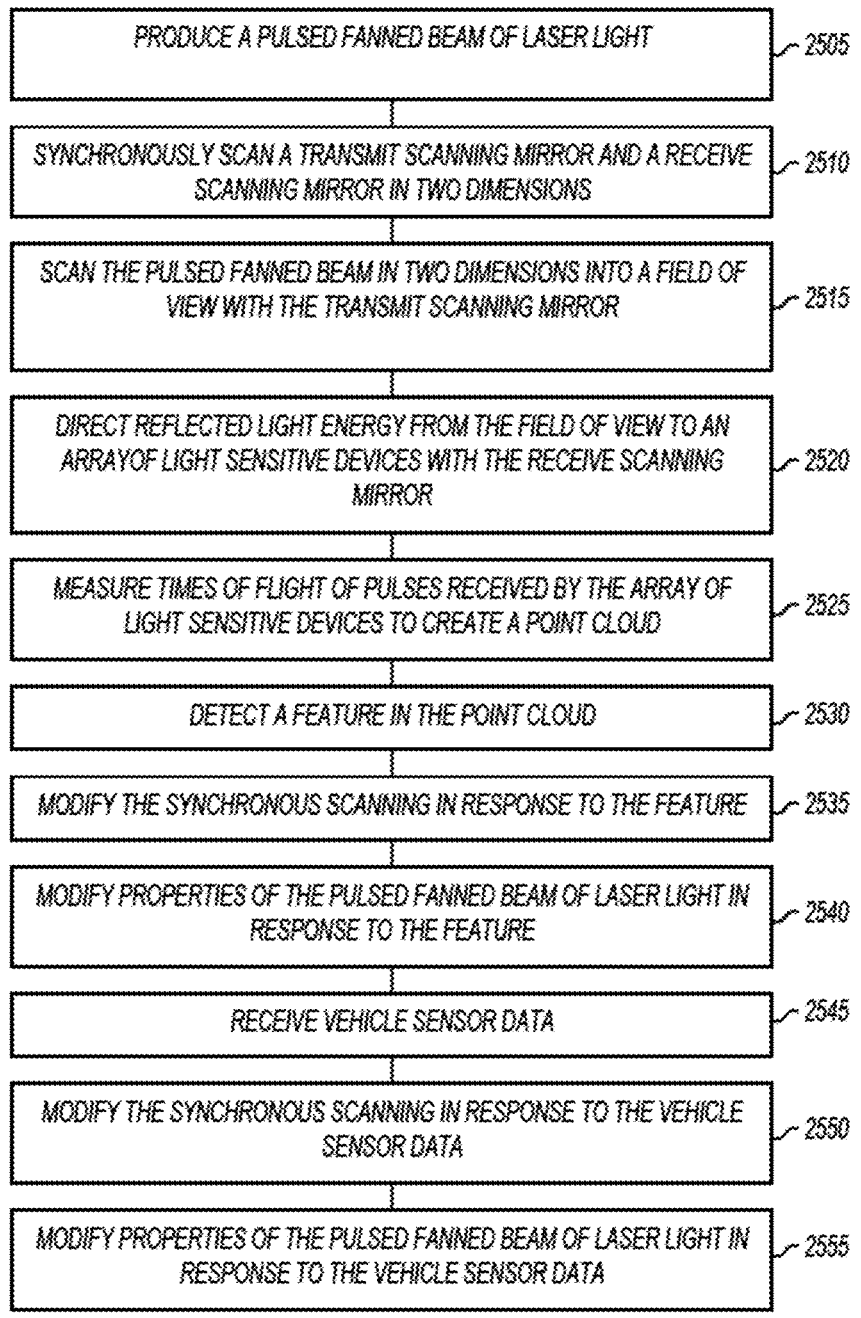
FIG. 27 shows a flow diagram of methods in accordance with various embodiments of the present invention.

FIG. 27 shows a flow diagram of methods in accordance with various embodiments of the present invention. In some embodiments, method 2500, or portions thereof, is performed by a scanning LIDAR system or a scanning LIDAR module. In other embodiments, method 2500 is performed by a series of circuits or an electronic system. Method 2500 is not limited by the particular type of apparatus performing the method. The various actions in method 2500 may be performed in the order presented, or may be performed in a different order. Further, in some embodiments, some actions listed in FIG. 27 are omitted from method 2500.

Method 2500 is shown beginning with block 2505 where a pulsed fanned beam of laser light is produced. In some embodiments, a pulsed laser beam is produced by a single laser diode, and in other embodiments, the pulsed laser beam is performed by a plurality of laser diodes. The pulsed laser beam is collimated and focused into a fanned beam as described above. The fanned beam may have any width (in degrees of field of view) without departing from the scope of the present invention.

At 2510, a transmit scanning mirror and a receive scanning mirror are synchronously scanned in two dimensions. This corresponds to scanning mirror assemblies within transmit module 110 and receive module 130 synchronously scanning. At 2515, the pulsed fanned beam is scanned in two dimensions into a field of view with the transmit scanning mirror. This is illustrated in FIG. 1 where the transmit module is shown scanning the pulsed fanned beam 112 into the field of view 128, and the fan has the shape shown at 124. At 2520, reflected light energy from the field of view is directed to an array of light sensitive devices with the receive scanning mirror. The synchronous scanning of the transmit and receive scanning mirrors results in light collected in a receive aperture shown at 126 (FIG. 1) being directed to the arrayed receiver.

At 2525, times-of-flight of the detected light reflections are measured to create a point cloud. This corresponds to the operation of the various TOF measurement circuits described above.

At 2530, a feature is detected in the point cloud. This may correspond to the operation of computer vision processing 170 as they perform object detection, lane detection, horizon tracking, or the like. At 2535, the synchronous scanning of the transmit scanning mirror and receive scanning mirror is modified in response to the feature detected at 2530. For example, angular extents of mirror deflection and/or angular offsets of mirror deflection may be modified to track objects, traffic lanes, or horizons in the field of view. At 2540, properties of the pulsed fanned beam of laser light are modified in response to the feature detected at 2530. For example, pulse power, pulse rate, pulse width, and/or number of multishot pulses may be modified in response to the feature detected at 2530. Also for example, the scanned beam fan angle may be modified in response to the feature detected at 2530.

At 2545, vehicle sensor data is received. This may correspond to control circuit 140 receiving data from vehicle sensors such speed sensors, inertial measurement unit (IMU) sensors, or the like. At 2550, the synchronous scanning of the transmit scanning mirror and receive scanning mirror is modified in response to the vehicle sensor data received at 2545. For example, angular extents of mirror deflection and/or angular offsets of mirror deflection may be modified in response to vehicle speed data or other vehicle sensor data. At 2555, properties of the pulsed fanned beam of laser light are modified in response to the vehicle sensor data received at 2545. For example, pulse power, pulse rate, pulse width, and/or number of multishot pulses may be modified in response to the vehicle sensor data received at 2545. Also for example, the scanned beam fan angle may be modified in response to the vehicle sensor data received at 2545.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a first laser light source;
   a first optical device positioned to focus light from the first laser light source into a first fanned beam having a first major axis and a first minor axis;
   a second laser light source;
   a second optical device positioned to focus light from the second laser light source into a second fanned beam having a second major axis and a second minor axis;
   a first scanning mirror to scan at least a first portion of the first fanned beam in a first scan direction in a field of view; and
   a second scanning mirror to scan at least a first portion of the second fanned beam in the first scan direction in the field of view, where the first scanning mirror does not scan the first portion of the second fanned beam and the second scanning mirror does not scan the first portion of the first fanned beam, and wherein the first scan direction is substantially parallel to both the first major axis of the first fanned beam and the second major axis of the second fanned beam in the field of view, and wherein the first scanning mirror scans at least the first portion of the first fanned beam and second scanning mirror scans at least the first portion of the second fanned beam such that the first major axis of the first fanned beam is substantially coincident with the second major axis of the second fanned beam in the field of view.

2. The apparatus of claim 1 wherein:
the first fanned beam has a first fan angle on the first major axis;
the second fanned beam has a second fan angle on the second major axis; and
the first and second optical devices and the first and second scanning mirrors are positioned relative to each other such that the first and second fanned beams are positioned to include a non-overlapping portion to create a combined fanned beam having a combined fan angle greater than either the first fan angle or the second fan angle.

3. The apparatus of claim 1 wherein:
the first fanned beam has a first fan angle on the first major axis;
the second fanned beam has a second fan angle on the second major axis; and
the first and second optical devices and the first and second scanning mirrors are positioned relative to each other such that the first and second fanned beams are positioned to substantially overlap to create a combined fanned beam having a combined fan angle substantially equal to either the first fan angle or the second fan angle.

4. The apparatus of claim 1 wherein mirror deflection of the first scanning mirror and mirror deflection of the second scanning mirror are controlled to determine an amount of overlap of the first fanned beam and the second fanned beam in the field of view.

5. The apparatus of claim 1 wherein:
the first scanning mirror is positioned to further scan a second portion of the second fanned beam; and
the second scanning mirror is positioned to further scan a second portion of the first fanned beam.

6. The apparatus of claim 1 wherein the first scanning mirror scans only the first portion of the first fanned beam and the second scanning mirror scans only the first portion of the second fanned beam.

7. The apparatus of claim 1 wherein the first and second laser light sources comprise multimode laser diodes.

8. The apparatus of claim 1 further comprising a third scanning mirror to scan the first and second fanned beams parallel to the first minor axis of the first fanned beam.

9. An apparatus comprising:
a first laser light source to produce a first pulsed fanned beam of laser light, the first pulsed fanned beam of laser light having a first major axis and a first minor axis;
a second laser light source to produce a second pulsed fanned beam of laser light, the second pulsed fanned beam of laser light having a second major axis and a second minor axis;
a first scanning mirror to scan at least a first portion of the first pulsed fanned beam of laser light in a first scan direction in a field of view; and
a second scanning mirror to scan at least a first portion of the second pulsed fanned beam of laser light in the first scan direction in the field of view, where the first scanning mirror does not scan the first portion of the second pulsed fanned beam and the second scanning mirror does not scan the first portion of the first pulsed fanned beam, and wherein the first scan direction is substantially parallel to both the first major axis of the first pulsed fanned beam and the second major axis of the second pulsed fanned beam in the field of view, and wherein the first scanning mirror scans at least the first portion of the first pulsed fanned beam and second scanning mirror scans at least the first portion of the second pulsed fanned beam such that the first major axis of the first pulsed fanned beam is substantially coincident with the second major axis of the second pulsed fanned beam in the field of view;
wherein the first scanning mirror and the second scanning mirror are operable to control an amount of overlap of the first pulsed fanned beam of laser light and the second pulsed fanned beam of laser light in the field of view.

10. The apparatus of claim 9 further comprising a third scanning mirror to scan the first and second pulsed fanned beams in a direction substantially perpendicular to the first major axis of the first pulsed fanned beam of laser light.

11. The apparatus of claim 9 wherein the first and second laser light sources comprise multimode laser diodes.

12. The apparatus of claim 9 further comprising a control circuit coupled to control angular extents of mirror deflection and relative angular offsets of the first scanning mirror and the second scanning mirror to control an amount of overlap of the first pulsed fanned beam of laser light and the second pulsed fanned beam of laser light in the field of view.

13. The apparatus of claim 12 further comprising a receive module with a scanning mirror assembly coupled to be responsive to the control circuit.

14. The apparatus of claim 13 wherein the receive module comprises an arrayed receiver with a plurality of light sensitive devices.

15. A light detection and ranging system comprising:
a first laser light source to emit first laser light pulses in a first fanned beam having a first major axis and a first minor axis;
a second laser light source to emit second laser light pulses in a second fanned beam having a second major axis and a second minor axis;
a first scanning mirror assembly comprising a first scanning mirror to scan at least a first portion of the first fanned beam in a first scan direction in a field of view, a second scanning mirror to scan at least a first portion of the second fanned beam in the first scan direction in the field of view, and a third scanning mirror to scan the first fanned beam and the second fanned beam in a second scan direction in the field of view, where the first scanning mirror does not scan the first portion of the second fanned beam and the second scanning mirror does not scan the first portion of the first fanned beam, where the first scan direction is substantially parallel to both the first major axis of the first fanned beam and the second major axis of the second fanned beam in the field of view, and wherein the second scan direction is substantially perpendicular to both the first major axis of the first fanned beam and the second major axis of the second fanned beam in the field of view, and wherein the first scanning mirror scans at least the first portion of the first fanned beam and second scanning mirror scans at least the first portion of the second fanned beam such that the first major axis of the first fanned beam is substantially coincident with the second major axis of the second fanned beam in the field of view;

an array of light sensitive devices to receive reflections of the first laser light pulses and the second laser light pulses;

a second scanning mirror assembly to synchronously scan with the first scanning mirror assembly and direct the reflections of the first laser light pulses and second laser light pulses onto the array of light sensitive devices; and a plurality of time-of-flight measurement circuits responsive to the array of light sensitive devices.

16. The light detection and ranging system of claim 15 further comprising a control circuit to selectively apply offsets to the first scanning mirror and the second scanning mirror to modify an amount of overlap of the first fanned beam on the first major axis and the second fanned beams on the second major axis.

17. The light detection and ranging system of claim 16 wherein the control circuit is coupled to receive vehicle sensor data, and the control circuit selectively applies the offsets as a function of vehicle speed.

18. The light detection and ranging system of claim 17 wherein the control circuit increases the amount of overlap of the first and second fanned beams as vehicle speed increases.

19. The light detection and ranging system of claim 15 further comprising a control circuit to control angular extents of mirror deflection of the first scanning mirror and of mirror deflection the second scanning mirror.

20. The light detection and ranging system of claim 19 wherein the control circuit selectively applies offsets to the first scanning mirror and the second scanning mirror as a function of angular extents of the mirror deflection of the first scanning mirror and the mirror deflection of the second scanning mirror.

\* \* \* \* \*